(12) United States Patent
Zan et al.

(10) Patent No.: US 10,116,934 B2
(45) Date of Patent: Oct. 30, 2018

(54) IMAGE PROCESSING METHOD AND APPARATUS

(71) Applicant: Huawei Technologies Co., Ltd., Shenzhen (CN)

(72) Inventors: Jinwen Zan, Shenzhen (CN); Sixin Lin, Shenzhen (CN); Siwei Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 231 days.

(21) Appl. No.: 15/178,004

(22) Filed: Jun. 9, 2016

(65) Prior Publication Data

US 2016/0295213 A1 Oct. 6, 2016

Related U.S. Application Data

(63) Continuation of application No. PCT/CN2014/093650, filed on Dec. 12, 2014.

(30) Foreign Application Priority Data

Dec. 13, 2013 (CN) .......................... 2013 1 0689002

(51) Int. Cl.
*H04N 19/105* (2014.01)
*H04N 19/56* (2014.01)
(Continued)

(52) U.S. Cl.
CPC ......... *H04N 19/105* (2014.11); *H04N 19/176* (2014.11); *H04N 19/433* (2014.11); *H04N 19/513* (2014.11); *H04N 19/56* (2014.11)

(58) Field of Classification Search
CPC .. H04N 19/105; H04N 19/176; H04N 19/433; H04N 19/513; H04N 19/56
See application file for complete search history.

(56) References Cited

U.S. PATENT DOCUMENTS

2004/0008780 A1   1/2004  Lai et al.
2005/0254581 A1  11/2005  Iguchi et al.
(Continued)

FOREIGN PATENT DOCUMENTS

CN   102257821 A   11/2011
CN   103079067 A    5/2013
(Continued)

OTHER PUBLICATIONS

Machine Translation and Abstract of Japanese Publication No. 2009-135964, Jun. 18, 2009, 49 pages.
(Continued)

*Primary Examiner* — Tat C Chio
(74) *Attorney, Agent, or Firm* — Conley Rose, P.C.

(57) ABSTRACT

An image processing method includes acquiring N pieces of motion information from N adjacent image blocks adjacent to a current image block, where the N adjacent image blocks are in a one-to-one correspondence with the N pieces of motion information, and the N pieces of motion information are in a one-to-one correspondence with the N reference image blocks, determining candidate motion information from the N pieces of motion information according to a preset rule, determining, in the reference image, a location range of a to-be-stored pixel, and storing all pixels in the location range, where the location range covers all pixels of a candidate reference image block, and reading the pixels in the location range, and performing encoding processing on the current image block according to the pixels in the location range.

31 Claims, 8 Drawing Sheets

(51) Int. Cl.
    *H04N 19/513* (2014.01)
    *H04N 19/433* (2014.01)
    *H04N 19/176* (2014.01)

(56) References Cited

U.S. PATENT DOCUMENTS

| | | |
|---|---|---|
| 2006/0072665 A1 | 4/2006 | Cho et al. |
| 2008/0152013 A1 | 6/2008 | Etoh et al. |
| 2008/0192827 A1 | 8/2008 | Beric et al. |
| 2008/0204602 A1 | 8/2008 | Beric et al. |
| 2008/0205527 A1 | 8/2008 | Watanabe et al. |
| 2011/0135285 A1* | 6/2011 | Imanaka ............... H04N 19/52 386/328 |
| 2011/0286524 A1 | 11/2011 | Wu |
| 2012/0189062 A1* | 7/2012 | Sugio .................. H04N 19/176 375/240.16 |
| 2013/0243097 A1 | 9/2013 | Murakami |
| 2014/0003526 A1 | 1/2014 | Amon |
| 2014/0247880 A1 | 9/2014 | Wen et al. |
| 2016/0295213 A1 | 10/2016 | Zan et al. |

FOREIGN PATENT DOCUMENTS

| | | |
|---|---|---|
| CN | 103108178 A | 5/2013 |
| CN | 103404145 A | 11/2013 |
| JP | 2005530420 A | 10/2005 |
| JP | 2006109418 A | 4/2006 |
| JP | 2008538433 A | 10/2008 |
| JP | 2009135964 A | 6/2009 |
| JP | 2010088122 A | 4/2010 |
| JP | 2012138932 A | 7/2012 |
| JP | 2012151576 A | 8/2012 |
| WO | 03107679 A2 | 12/2003 |
| WO | 2006109209 A1 | 10/2006 |
| WO | 2007055013 A1 | 5/2007 |
| WO | 2010124736 A1 | 11/2010 |
| WO | 2013155274 A1 | 10/2013 |
| WO | 2015085945 A1 | 6/2015 |

OTHER PUBLICATIONS

Foreign Communication From a Counterpart Application, Japanese Application No. 2016-538630, Japanese Office Action dated Jun. 20, 2017, 7 pages.

Foreign Communication From a Counterpart Application, Japanese Application No. 2016-538630, English Translation of Japanese Office Action dated Jun. 20, 2017, 9 pages.

Tsai, C., et al., "Low Power Cache Algorithm and Architecture Design for Fast Motion Estimation in H.264/AVC Encoder System," International Conference on Acoustics, Speech, and Signal Processing, Apr. 15, 2007, pp. 97-100.

Foreign Communication From a Counterpart Application, European Application No. 14868808.8, Extended European Search Report dated Oct. 14, 2016, 12 pages.

Foreign Communication From a Counterpart Application, PCT Application No. PCT/CN2014/093650, English Translation of International Search Report dated Mar. 17, 2015, 2 pages.

Foreign Communication From a Counterpart Application, PCT Application No. PCT/CN2014/093650, English Translation of Written Opinion dated Mar. 17, 2015, 9 pages.

* cited by examiner

100

```
┌─────────────────────────────────────────────────────────┐
│   Acquire N pieces of motion information from N adjacent image
│ blocks adjacent to a current image block, where the N adjacent image
│     blocks are in a one-to-one correspondence with the N pieces of
│   motion information, the N pieces of motion information are used to      S110
│ indicate N reference image blocks in a reference image of the current
│ image block, and the N pieces of motion information are in a one-to-
│           one correspondence with the N reference image blocks
└─────────────────────────────────────────────────────────┘
                              │
                              ▼
┌─────────────────────────────────────────────────────────┐
│ Determine candidate motion information from the N pieces of motion
│   information according to a preset rule, where the candidate motion      S120
│    information is at least one piece of information of the N pieces of
│                          motion information
└─────────────────────────────────────────────────────────┘
                              │
                              ▼
┌─────────────────────────────────────────────────────────┐
│   Determine, in the reference image, a location range of a to-be-stored
│       pixel according to the candidate motion information, and store all
│ pixels in the location range, where the location range covers all pixels
│   of a candidate reference image block, the candidate reference image     S130
│       block is at least one image block of the N reference image blocks,
│            and the candidate reference image block is an image block
│                  corresponding to the candidate motion information
└─────────────────────────────────────────────────────────┘
                              │
                              ▼
┌─────────────────────────────────────────────────────────┐
│       Read the pixels in the location range, and perform encoding
│  processing on the current image block according to the pixels in the     S140
│             location range, to generate a target data stream
└─────────────────────────────────────────────────────────┘
```

```
┌─────────────────────────────────────────────────────────┐
│   Acquire N pieces of motion information from N adjacent image │
│ blocks adjacent to a current image block, where the N adjacent image │
│     blocks are in a one-to-one correspondence with the N pieces of │
│  motion information, the N pieces of motion information are used to │    S210
│ indicate N reference image blocks in a reference image of the current │
│   image block, and the N pieces of motion information are in a one-to- │
│           one correspondence with the N reference image blocks │
└─────────────────────────────────────────────────────────┘
                              │
                              ▼
┌─────────────────────────────────────────────────────────┐
│ Determine, in the reference image, a location range of a to-be-stored │
│   pixel, and store all pixels in the location range, where the location │
│  range covers all pixels of a candidate reference image block, and the │    S220
│ candidate reference image block is at least one image block of the N │
│                        reference image blocks │
└─────────────────────────────────────────────────────────┘
                              │
                              ▼
┌─────────────────────────────────────────────────────────┐
│ Read the pixels in the location range according to candidate motion │
│       information of the motion information, and perform decoding │
│      processing on a target data stream according to the pixels in the │    S230
│     location range, to reconstruct the current image block, where the │
│ candidate motion information is motion information corresponding to │
│                  the candidate reference image block │
└─────────────────────────────────────────────────────────┘
```

FIG. 4

IMAGE PROCESSING METHOD AND APPARATUS

CROSS-REFERENCE TO RELATED APPLICATIONS

This application is a continuation of International Application No. PCT/CN2014/093650, filed on Dec. 12, 2014, which claims priority to Chinese Patent Application No. 201310689002.1, filed on Dec. 13, 2013, both of which are hereby incorporated by reference in their entireties.

TECHNICAL FIELD

The present disclosure relates to the field of video processing, and in particular, to an image processing method and apparatus.

BACKGROUND

With the rapid development of the Internet and the increasingly rich material and spiritual culture of people, there are increasing application demands for a video on the Internet, especially application demands for a high-definition video. However, a data volume of a high-definition video is very large, and in order to transmit a high-definition video on the Internet with limited bandwidth, a problem of high-definition video compression encoding and decoding is a problem that needs to be resolved first.

Currently, there is an encoding and decoding technology in which multiple pieces of motion information are acquired from an adjacent image block, a piece of optimal motion information is selected from the acquired multiple pieces of motion information, and motion compensation is performed on a current coding block using the optimal motion information. It should be noted that, the foregoing adjacent image block may be a temporally adjacent image block or a spatially adjacent image block. The spatially adjacent image block is an encoded or decoded image block in a same image (for example, a same video frame) as a currently processed image block, and the temporally neighboring block is a corresponding encoded or decoded image block in a time-domain reference image (for example, a forward reference frame or a backward reference frame) of the currently processed image block. Therefore, the motion information of the adjacent image block can be effectively used to determine motion information of the currently processed image block without explicitly writing motion information of the current coding block into a data stream.

However, in the foregoing process of selecting a piece of optimal motion information from the acquired multiple pieces of motion information, it is required to perform calculation based on a pixel block that is in a reference image (also referred to as a reference image block) and is corresponding to each piece of motion information (or a pixel block to which each piece of motion information points). Therefore, it is required to read, from the reference image, a reference image block to which each piece of motion information points, and store the reference image block in a memory for use of calculating the foregoing optimal motion information.

In particular, when there is a relatively large quantity of candidate motion vectors, it is required to store a relatively large quantity of reference image blocks. As a result, a higher requirement is imposed on memory bandwidth, and system costs are increased.

Therefore, it is desired to provide a technology that can reduce the requirement on memory bandwidth.

SUMMARY

Embodiments of the present disclosure provide an image processing method and apparatus, which can reduce a requirement on memory bandwidth.

According to a first aspect, an image processing method is provided, where the method includes acquiring N pieces of motion information from N adjacent image blocks adjacent to a current image block, where the N adjacent image blocks are in a one-to-one correspondence with the N pieces of motion information, the N pieces of motion information are used to indicate N reference image blocks in a reference image of the current image block, and the N pieces of motion information are in a one-to-one correspondence with the N reference image blocks, determining candidate motion information from the N pieces of motion information according to a preset rule, where the candidate motion information is at least one piece of information of the N pieces of motion information, determining, in the reference image, a location range of a to-be-stored pixel according to the candidate motion information, and storing all pixels in the location range, where the location range covers all pixels of a candidate reference image block, the candidate reference image block is at least one image block of the N reference image blocks, and the candidate reference image block is an image block corresponding to the candidate motion information, and reading the pixels in the location range, and performing encoding processing on the current image block according to the pixels in the location range, to generate a target data stream.

In a first possible implementation manner, the candidate reference image block is at least two image blocks of the N reference image blocks, the candidate motion information is at least two pieces of motion information of the N pieces of motion information, and reading the pixels in the location range, and performing encoding processing on the current image block according to the pixels in the location range includes reading the pixels in the location range according to the candidate motion information, to acquire the candidate reference image block, determining optimal motion information from the candidate motion information according to the candidate reference image block, and performing encoding processing on the current image block according to the optimal motion information.

With reference to the first aspect and the first possible implementation manner, in a second possible implementation manner, the candidate reference image block is some image blocks of the N reference image blocks.

With reference to the first aspect, the first possible implementation manner, and the second possible implementation manner, in a third possible implementation manner, determining candidate motion information from the N pieces of motion information according to a preset rule includes determining the candidate motion information from the N pieces of motion information according to available memory bandwidth and/or attribute information of an image to which the current image block belongs, where the attribute information is used to indicate at least one of the following parameters definition of the image to which the current image block belongs, content of the image to which the current image block belongs, a source of the image to which the current image block belongs, or a production style of the image to which the current image block belongs.

With reference to the first aspect, the first possible implementation manner, the second possible implementation manner, and the third possible implementation manner, in a fourth possible implementation manner, reading the pixels in the location range, and performing encoding processing on the current image block according to the pixels in the location range, to generate a target data stream includes reading the pixels in the location range, and performing encoding processing on the current image block according to the pixels in the location range, to generate the target data stream, where the target data stream includes first index information, and the first index information is used to indicate the candidate motion information.

With reference to the first aspect, the first possible implementation manner, the second possible implementation manner, the third possible implementation manner, and the fourth possible implementation manner, in a fifth possible implementation manner, reading the pixels in the location range, and performing encoding processing on the current image block according to the pixels in the location range, to generate a target data stream includes reading the pixels in the location range, and performing encoding processing on the current image block according to the pixels in the location range, to generate the target data stream, where the target data stream includes second index information, and the second index information is used to indicate a location and a coverage range of the location range in the reference image.

With reference to the first aspect, the first possible implementation manner, the second possible implementation manner, the third possible implementation manner, the fourth possible implementation manner, and the fifth possible implementation manner, in a sixth possible implementation manner, the candidate reference image block is all image blocks of the N reference image blocks.

According to a second aspect, an image processing method is provided, where the method includes acquiring N pieces of motion information from N adjacent image blocks adjacent to a current image block, where the N adjacent image blocks are in a one-to-one correspondence with the N pieces of motion information, the N pieces of motion information are used to indicate N reference image blocks in a reference image of the current image block, and the N pieces of motion information are in a one-to-one correspondence with the N reference image blocks, determining, in the reference image, a location range of a to-be-stored pixel, and storing all pixels in the location range, where the location range covers all pixels of a candidate reference image block, and the candidate reference image block is at least one image block of the N reference image blocks, and reading the pixels in the location range according to candidate motion information of the motion information, and performing decoding processing on a target data stream according to the pixels in the location range, to reconstruct the current image block, where the candidate motion information is motion information corresponding to the candidate reference image block.

In a first possible implementation manner, the candidate reference image block is at least two image blocks of the N reference image blocks, the candidate motion information is at least two pieces of motion information of the N pieces of motion information, and reading the pixels in the location range according to candidate motion information of the motion information, and performing decoding processing on a target data stream according to the pixels in the location range includes determining the candidate motion information from the N pieces of motion information, reading the pixels in the location range according to the candidate motion information, to acquire the candidate reference image block, determining optimal motion information from the candidate motion information according to the candidate reference image block, and performing decoding processing on the target data stream according to the optimal motion information.

With reference to the second aspect and the first possible implementation manner, in a second possible implementation manner, the candidate reference image block is all image blocks of the N reference image blocks.

With reference to the second aspect, the first possible implementation manner, and the second possible implementation manner, in a third possible implementation manner, the candidate reference image block is some image blocks of the N reference image blocks.

With reference to the second aspect, the first possible implementation manner, the second possible implementation manner, and the third possible implementation manner, in a fourth possible implementation manner, determining, in the reference image, a location range of a to-be-stored pixel includes determining the candidate motion information from the N pieces of motion information, and determining the location range in the reference image according to the candidate motion information.

With reference to the second aspect, the first possible implementation manner, the second possible implementation manner, the third possible implementation manner, and the fourth possible implementation manner, in a fifth possible implementation manner, determining the candidate motion information from the N pieces of motion information includes determining the candidate motion information from the N pieces of motion information according to available memory bandwidth and/or attribute information of an image to which the current image block belongs, where the attribute information is used to indicate at least one of the following parameters: definition of the image to which the current image block belongs, content of the image to which the current image block belongs, a source of the image to which the current image block belongs, or a production style of the image to which the current image block belongs.

With reference to the second aspect, the first possible implementation manner, the second possible implementation manner, the third possible implementation manner, the fourth possible implementation manner, and the fifth possible implementation manner, in a sixth possible implementation manner, determining the candidate motion information from the N pieces of motion information includes acquiring first index information from the target data stream, where the first index information is used to indicate the candidate motion information, and determining the candidate motion information from the N pieces of motion information according to the first index information.

With reference to the second aspect, the first possible implementation manner, the second possible implementation manner, the third possible implementation manner, the fourth possible implementation manner, the fifth possible implementation manner, and the sixth possible implementation manner, in a seventh possible implementation manner, determining, in the reference image, a location range of a to-be-stored pixel includes acquiring second index information from the target data stream, where the second index information is used to indicate a location and a coverage range of the location range in the reference image, and determining the location range in the reference image according to the second index information.

According to a third aspect, an image processing apparatus is provided, where the apparatus includes an acquiring unit configured to acquire N pieces of motion information from N adjacent image blocks adjacent to a current image block, where the N adjacent image blocks are in a one-to-one correspondence with the N pieces of motion information, the N pieces of motion information are used to indicate N reference image blocks in a reference image of the current image block, and the N pieces of motion information are in a one-to-one correspondence with the N reference image blocks, a determining unit configured to determine candidate motion information from the N pieces of motion information according to a preset rule, where the candidate motion information is at least one piece of information of the N pieces of motion information, and determine, in the reference image, a location range of a to-be-stored pixel according to the candidate motion information, where the location range covers all pixels of a candidate reference image block, the candidate reference image block is at least one image block of the N reference image blocks, and the candidate motion information is motion information corresponding to the candidate reference image block, a storage unit configured to store all pixels in the location range, and a processing unit configured to read the pixels in the location range from the storage unit, and perform encoding processing on the current image block according to the pixels in the location range, to generate a target data stream.

In a first possible implementation manner, the candidate reference image block is at least two image blocks of the N reference image blocks, the candidate motion information is at least two pieces of motion information of the N pieces of motion information, and the processing unit is further configured to read the pixels in the location range from the storage unit according to the candidate motion information, to acquire the candidate reference image block, determine optimal motion information from the candidate motion information according to the candidate reference image block, and perform encoding processing on the current image block according to the optimal motion information.

With reference to the third aspect and the first possible implementation manner, in a second possible implementation manner, the candidate reference image block is some image blocks of the N reference image blocks.

With reference to the third aspect, the first possible implementation manner, and the second possible implementation manner, in a third possible implementation manner, the determining unit is further configured to determine the candidate motion information from the N pieces of motion information according to available memory bandwidth and/or attribute information of an image to which the current image block belongs, and determine the location range in the reference image according to the candidate motion information, where the attribute information is used to indicate at least one of the following parameters: definition of the image to which the current image block belongs, content of the image to which the current image block belongs, a source of the image to which the current image block belongs, or a production style of the image to which the current image block belongs.

With reference to the third aspect, the first possible implementation manner, the second possible implementation manner, and the third possible implementation manner, in a fourth possible implementation manner, the processing unit is further configured to read the pixels in the location range from the storage unit, and perform encoding processing on the current image block according to the pixels in the location range, to generate the target data stream, where the target data stream includes first index information, and the first index information is used to indicate the candidate motion information.

With reference to the third aspect, the first possible implementation manner, the second possible implementation manner, the third possible implementation manner, and the fourth possible implementation manner, in a fifth possible implementation manner, the processing unit is further configured to read the pixels in the location range from the storage unit, and perform encoding processing on the current image block according to the pixels in the location range, to generate the target data stream, where the target data stream includes second index information, and the second index information is used to indicate a location and a coverage range of the location range in the reference image.

With reference to the third aspect, the first possible implementation manner, the second possible implementation manner, the third possible implementation manner, the fourth possible implementation manner, and the fifth possible implementation manner, in a sixth possible implementation manner, the candidate reference image block is all image blocks of the N reference image blocks.

According to a fourth aspect, an image processing apparatus is provided, where the apparatus includes an acquiring unit configured to acquire N pieces of motion information from N adjacent image blocks adjacent to a current image block, where the N adjacent image blocks are in a one-to-one correspondence with the N pieces of motion information, the N pieces of motion information are used to indicate N reference image blocks in a reference image of the current image block, and the N pieces of motion information are in a one-to-one correspondence with the N reference image blocks, a determining unit configured to determine, in the reference image, a location range of a to-be-stored pixel, where the location range covers all pixels of a candidate reference image block, and the candidate reference image block is at least one image block of the N reference image blocks, a storage unit configured to store all pixels in the location range, and a processing unit configured to read the pixels in the location range from the storage unit according to candidate motion information of the motion information, and perform decoding processing on a target data stream according to the pixels in the location range, to reconstruct the current image block, where the candidate motion information is motion information corresponding to the candidate reference image block.

In a first possible implementation manner, the candidate reference image block is at least two image blocks of the N reference image blocks, the candidate motion information is at least two pieces of motion information of the N pieces of motion information, and the determining unit is further configured to determine the candidate motion information from the N pieces of motion information, and the processing unit is further configured to acquire the candidate motion information from the determining unit, read the pixels in the location range according to the candidate motion information, to acquire the candidate reference image block, determine optimal motion information from the candidate motion information according to the candidate reference image block, and perform decoding processing on the target data stream according to the optimal motion information.

With reference to the fourth aspect and the first possible implementation manner, in a second possible implementation manner, the candidate reference image block is all image blocks of the N reference image blocks.

With reference to the fourth aspect, the first possible implementation manner, and the second possible implementation manner, in a third possible implementation manner, the candidate reference image block is some image blocks of the N reference image blocks.

With reference to the fourth aspect, the first possible implementation manner, the second possible implementation manner, and the third possible implementation manner, in a fourth possible implementation manner, the determining unit is further configured to determine the candidate motion information from the N pieces of motion information, and determine the location range in the reference image according to the candidate motion information.

With reference to the fourth aspect, the first possible implementation manner, the second possible implementation manner, the third possible implementation manner, and the fourth possible implementation manner, in a fifth possible implementation manner, the determining unit is further configured to determine the candidate motion information from the N pieces of motion information according to available memory bandwidth and/or attribute information of an image to which the current image block belongs, where the attribute information is used to indicate at least one of the following parameters: definition of the image to which the current image block belongs, content of the image to which the current image block belongs, a source of the image to which the current image block belongs, or a production style of the image to which the current image block belongs.

With reference to the fourth aspect, the first possible implementation manner, the second possible implementation manner, the third possible implementation manner, the fourth possible implementation manner, and the fifth possible implementation manner, in a sixth possible implementation manner, the determining unit is further configured to acquire first index information from the target data stream, and determine the candidate motion information from the N pieces of motion information according to the first index information, where the first index information is used to indicate the candidate motion information.

With reference to the fourth aspect, the first possible implementation manner, the second possible implementation manner, the third possible implementation manner, the fourth possible implementation manner, the fifth possible implementation manner, and the sixth possible implementation manner, in a seventh possible implementation manner, the determining unit is further configured to acquire second index information from the target data stream, and determine the location range in the reference image according to the second index information, where the second index information is used to indicate a location and a coverage range of the location range in the reference image.

According to the image processing method and apparatus in the embodiments of the present disclosure, a location range is determined in a reference image such that the location range covers pixels corresponding to at least one piece of motion information, and in a case in which pixels in the foregoing location range are read into a memory at a time, optimal motion information can be determined from the at least one piece of motion information instead of separately reading corresponding pixels for each piece of motion information. Therefore, a requirement on memory bandwidth can be reduced, and a system requirement and costs can be reduced.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

FIG. 1 is a schematic flowchart of an image processing method according to an embodiment of the present disclosure;

FIG. 4 is a schematic flowchart of an image processing method according to another embodiment of the present disclosure;

DESCRIPTION OF EMBODIMENTS

Figure 2A:
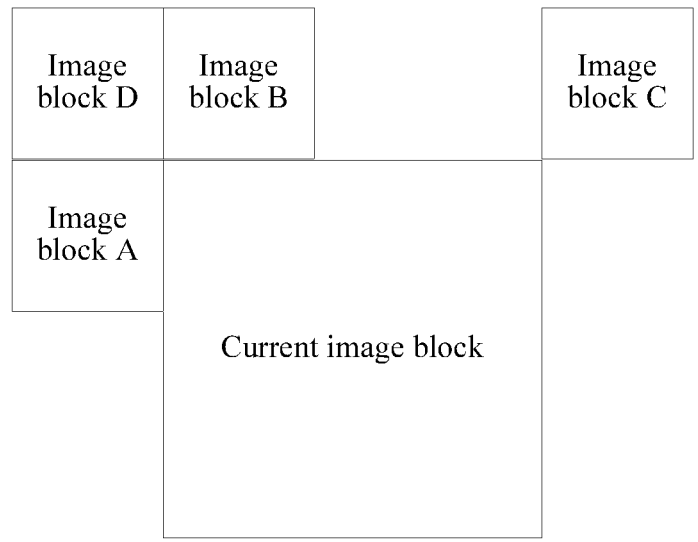
FIG. 2A is a schematic diagram of an adjacent image block spatially adjacent to a current image block.

The following clearly and describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

An image processing method and apparatus according to the embodiments of the present disclosure can be applicable to various technologies for implementing encoding and decoding on a current image block by determining optimal motion information from multiple pieces of motion information and performing motion compensation on the current image block according to the optimal motion information, for example, a technology, such as a decoder-side motion vector derivation (DMVD) technology, a merge technology, and an advanced motion vector prediction (AMVP) technology, of determining motion information of a currently processed image block using motion information of an adjacent image block. For ease of understanding and description, description is provided below using an example in which the image processing method and apparatus in the embodiments of the present disclosure are applied to the DMVD technology.

In addition, in the embodiments of the present disclosure, an image may be a video frame in a video. In this case, an image block may be a frame block in the video frame.

FIG. 1 shows a schematic flowchart of an image processing method 100, described from a perspective of an encoder side, according to an embodiment of the present disclosure. As shown in FIG. 1, the method 100 includes the following steps.

Step S110: Acquire N pieces of motion information from N adjacent image blocks adjacent to a current image block, where the N adjacent image blocks are in a one-to-one correspondence with the N pieces of motion information, the N pieces of motion information are used to indicate N reference image blocks in a reference image of the current image block, and the N pieces of motion information are in a one-to-one correspondence with the N reference image blocks.

Step S120: Determine candidate motion information from the N pieces of motion information according to a preset rule, where the candidate motion information is at least one piece of information of the N pieces of motion information.

Step S130: Determine, in the reference image, a location range of a to-be-stored pixel according to the candidate motion information, and store all pixels in the location range, where the location range covers all pixels of a candidate reference image block, the candidate reference image block is at least one image block of the N reference image blocks, and the candidate reference image block is an image block corresponding to the candidate motion information.

Step S140: Read the pixels in the location range, and perform encoding processing on the current image block according to the pixels in the location range, to generate a target data stream.

Furthermore, the encoder side may acquire N pieces of motion information, where N is a positive integer.

In this embodiment of the present disclosure, the motion information may include one or more of a prediction direction, a reference image index, or a motion vector, where the prediction direction may be unidirectional (unidirectional prediction) and bidirectional (bidirectional prediction), and unidirectional prediction may include forward prediction and backward prediction.

Forward prediction refers to generating a prediction signal using a reference image in a forward reference image list, that is, a list 0.

Backward prediction refers to generating a prediction signal using a reference image in a backward reference image list, that is, a list 1. Bidirectional prediction refers to generating a prediction signal by simultaneously using a reference image in the list 0 and a reference image in the list 1.

For unidirectional prediction, a reference image index is required to indicate a reference image selected from the list 0 or the list 1. For bidirectional prediction, two reference image indexes are required to respectively indicate a reference image selected from the list 0 and a reference image selected from the list 1.

Each motion vector includes a horizontal direction component x and a vertical direction component y, which may be denoted by (x, y). For unidirectional prediction, a motion vector is required to indicate displacement of a prediction signal in a reference image selected from the list 0 or the list 1. For bidirectional prediction, two motion vectors are required to respectively indicate displacement of a forward prediction signal and a backward prediction signal in a reference image selected from the list 0 and a reference image selected from the list 1.

In this embodiment of the present disclosure, the motion information refers to motion information acquired from an adjacent image block of the current image block (that is, a to-be-encoded image block for an encoder side, and for a decoder side, an image block to be decoded and reconstructed). In this embodiment of the present disclosure, the motion information may include spatial motion information and temporal motion information.

The spatial motion information is motion information acquired from a spatially adjacent block of the current image block, and the temporal motion information refers to motion information acquired from a temporally adjacent block.

Figure 2B:
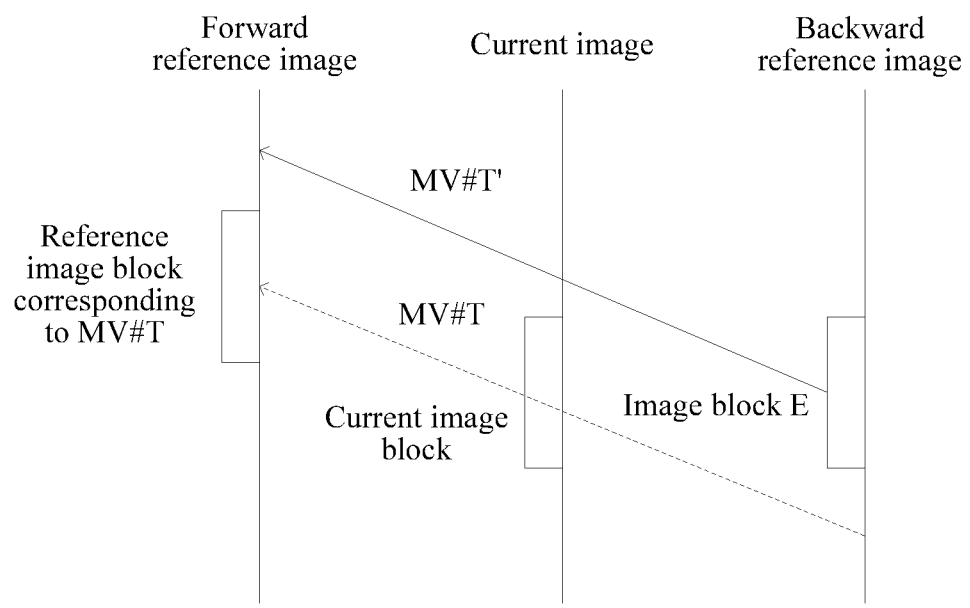
FIG. 2B is a schematic diagram of an adjacent image block temporally adjacent to a current image block.

FIG. 2A shows a source location (an acquired location) of spatial motion information in a DMVD technology, and FIG. 2B shows a source location of temporal motion information in a DMVD technology.

As shown in FIG. 2A, in the DMVD technology, the spatial motion information may include motion information of an image block A (an example of an adjacent block) on a left side of the current image block, where the motion information is denoted by MV#A below, motion information of an image block B (another example of an adjacent block) on an upper side of the current image block, where the motion information is denoted by MV#B below, motion information of an image block C (another example of an adjacent block) on an upper right side of the current image block, where the motion information is denoted by MV#C below, and motion information of an image block D (another example of an adjacent block) on an upper left side of the current image block, where the motion information is denoted by MV#D below.

It should be noted that, when a prediction direction is unidirectional, a piece of motion information may indicate a reference block in a reference image, and when a prediction direction is bidirectional, a piece of motion information may indicate a reference block in a forward reference image and a reference block in a backward reference image.

As shown in FIG. 2B, in the DMVD technology, the temporal motion information may include for example, motion information acquired by performing shifting processing on MV#T' based on the current image block, where the motion information is denoted by MV#T below, and MV#T' is motion information of an image block E (another example of an adjacent block) that is in a backward reference image and is at a location corresponding to the current image block.

Therefore, the encoder side can obtain a motion information set (or a motion information list) including the foregoing five pieces of motion information, that is, an example of the N pieces of motion information, where the motion information set is denoted by:

{MV#A, MV#B, MV#C, MV#D, MV#T}.

It should be understood that, the foregoing illustrated method for acquiring the N pieces of motion information is merely for exemplary description, and the present disclosure is not limited thereto. A different acquisition method may be used according to a technology to which the image processing method in this embodiment of the present disclosure is applicable, which is not limited in the present disclosure.

After determining the N pieces of motion information as described above, the encoder side may determine a reference image block corresponding to each piece of motion information (or a reference image block to which each piece of motion information points) from a reference image. It should be noted herein that, in a case in which a prediction direction is bidirectional, the encoder side needs to respectively determine a reference image block corresponding to each motion information from the two reference images (the forward reference image and the backward reference image). For ease of understanding and description and without loss of generality, description is provided below using processing on the backward reference image as an example.

Then, the encoder side needs to determine a piece of motion information (referred to as target motion information below for ease of understanding and differentiation) from the N pieces of motion information in order to perform encoding processing, motion compensation processing on the current image block according to the target motion information. The process is described subsequently in detail.

In this embodiment of the present disclosure, the target motion information may be calculated in a calculation manner according to a preset rule (that is, a manner 1), or the target motion information may be determined according to an attribute of the current image block and/or device performance (that is, a manner 2). Processing in the foregoing two cases is described separately below in detail.

Manner 1

Optionally, the candidate reference image block is all image blocks of the N reference image blocks.

In this embodiment of the present disclosure, all the N pieces of motion information may be used as the candidate motion information. Therefore, optimal motion information may be determined from the N pieces of motion information in a calculation manner, and the optimal motion information is used as the foregoing target motion information. In a calculation process, it is required to acquire reference image blocks in the reference image (an example of candidate reference image blocks) corresponding to the N pieces of motion information (reference image blocks to which motion vectors point), and calculation is performed based on the reference image blocks (pixel values of pixels in the reference image blocks).

Therefore, in this embodiment of the present disclosure, the encoder side may determine location distribution of pixels (that is, each reference image block) in the reference image, where the pixels need to be stored and are used for subsequent processing.

Figure 3A:
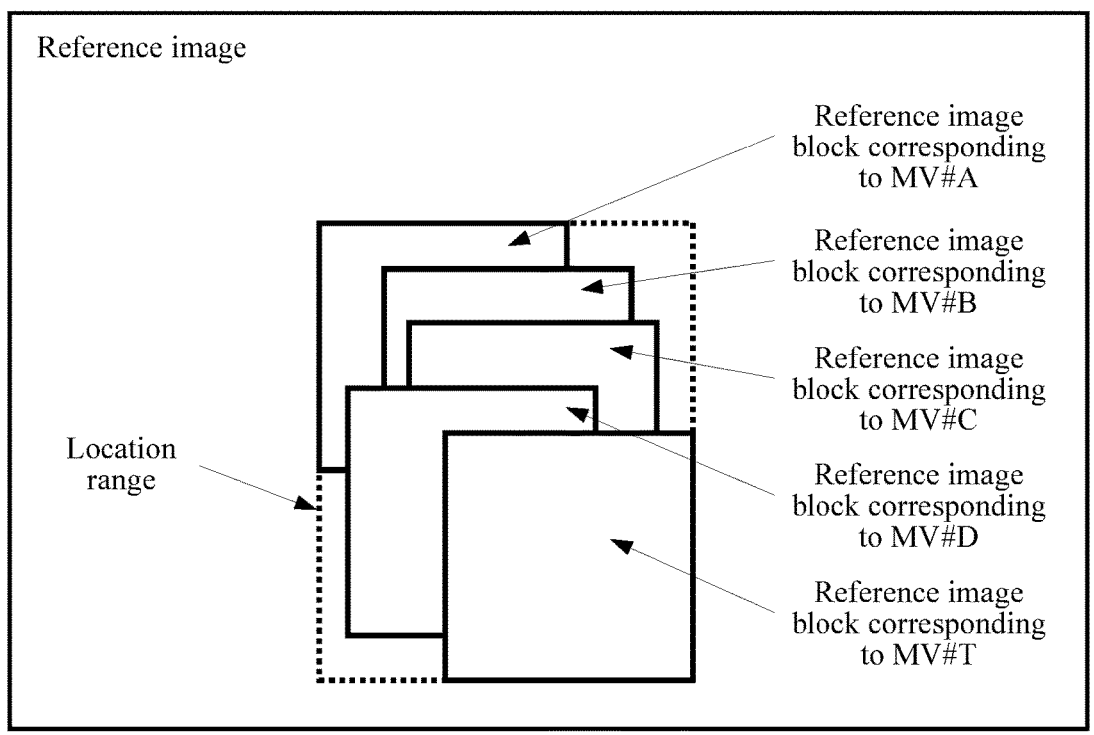
FIG. 3A is a schematic diagram of an example of a location range determined according to an image processing method of an embodiment of the present disclosure.
Figure 3B:
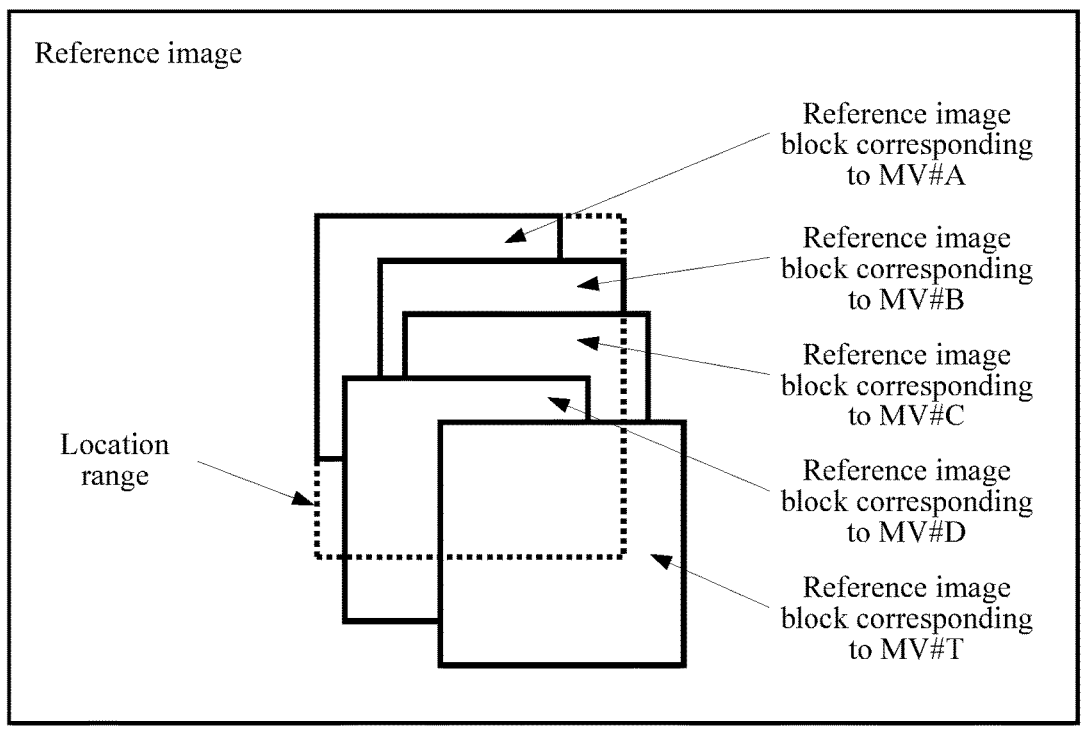
FIG. 3B is a schematic diagram of another example of a location range determined according to an image processing method of an embodiment of the present disclosure.

Because each piece of the foregoing determined motion information is acquired from an adjacent (temporally adjacent and/or spatially adjacent) image block of a current to-be-encoded block, there is relatively strong correlation (or similarity) between the pieces of motion information (motion vectors). Therefore, as shown in FIG. 3A and FIG. 3B, an outward manifestation is that the reference image blocks overlap, or multiple reference image blocks include a pixel at a same location.

In the prior art, an encoder side needs to separately acquire, from a reference image, a reference image block to which each piece of motion information points, and independently store each reference image block (pixel values in the reference image block) in memory space, to determine optimal motion information from N pieces of motion information based on each reference image block. Therefore, it is required that memory bandwidth of a device can meet reading of N reference image blocks, and a case in which the foregoing overlapping area is stored for multiple times may occur, that is, when the optimal motion information is being determined, it is required to perform N times of reading in a specified time, to read the N reference image blocks, resulting in a relatively high requirement on the memory bandwidth.

In contrast, in this embodiment of the present disclosure, an area (that is, a location range) may be determined from the reference image based on a feature that there is relatively strong correlation and similarity between the foregoing determined N pieces of motion information such that a range of the area can cover all pixels included by the N reference image blocks. For example rather than limitation, a minimum public image block, that is, an area shown by dotted lines in FIG. 3A, of the N reference image blocks may be used as the location range.

The minimum public image block may be determined in the following manner, that is assuming that coordinates of the current image block in a current to-be-encoded image are (cur_x, cur_y), and that a size thereof is (blk_x)×(blk_y) pixels, and without loss of generality, in a reference image, a horizontal component of a motion vector is denoted by x, and a vertical component of the motion vector is denoted by y, in the reference image, MV#A may be written as {MV#A_x, MV#A_y}, MV#B may be written as {MV#B_x, MV#B_y}, MV#C may be written as {MV#C_x, MV#C_y}, MV#D may be written as {MV#D_x, MV#D_y}, and MV#T may be written as {MV#T_x, MV#T_y}.

Therefore, it may be determined that in each reference image block, minimum displacement Δx_min in a horizontal direction relative to a target image block equals min (MV#A_x, MV#B_x, MV#C_x, MV#D_x, MV#T_x), maximum displacement Δx_max in the horizontal direction relative to the target image block equals max(MV#A_x, MV#B_x, MV#C_x, MV#D_x, MV#T_x), minimum displacement Δy_min in a vertical direction relative to the target image block equals min(MV#A_y, MV#B_y, MV#C_y, MV#D_y, MV#T_y), and maximum displacement Δy_max in the vertical direction relative to the target image block equals max(MV#A_y, MV#B_y, MV#C_y, MV#D_y, MV#T_y).

With this definition, the location range that is read from the reference image at a time and is temporarily stored may be a rectangular area, where coordinates of a pixel at an upper left corner of the rectangular area are (cur_x+Δx_min, cur_y+Δy_min), and coordinates of a pixel at a lower right corner of the rectangular area are (cur_x+Δx_max+blk_x, cur_y+Δy_max+blk_y).

Therefore, information (such as a pixel value) of each pixel in the location range may be read and stored in a memory, for use in subsequent processing of determining the optimal motion information.

Optionally, before determining, in the reference image, a location range of a to-be-stored pixel according to the candidate motion information of the motion information, the method further includes determining that at least two reference image blocks of the N reference image blocks overlap with each other.

Furthermore, after each reference image block is determined as described above, it may be first determined whether reference images overlap with each other, if the reference images overlap, the foregoing process of determining the location range and storing the information of the pixels in the location range may be executed.

Therefore, it can be ensured that a requirement on memory bandwidth is reduced compared with the prior art.

Optionally, before determining, in the reference image, a location range of a to-be-stored pixel according to the candidate motion information of the motion information, the method further includes determining that at least two reference image blocks of the N reference image blocks overlap with each other, and a quantity of overlapped reference image blocks is greater than or equal to a preset quantity threshold, or an overlapping range is greater than or equal to a preset range threshold.

Furthermore, after each reference image block is determined as described above, it may be first determined whether the reference images overlap with each other, and a feature of an overlapping area (for example, a quantity of overlapped reference image blocks and/or a size of an overlapping range) may be further determined if the reference images overlap, and if the feature of the foregoing overlapping area meets a preset condition, for example, the quantity of overlapped reference image blocks is greater than or equal to a preset quantity threshold, and/or the overlapping range is greater than or equal to a preset range threshold), the foregoing process of determining the location range and storing the information of the pixels in the location range may be executed. It should be noted that, the foregoing quantity threshold may be set according to a quantity of reference image blocks (or a quantity of pieces of motion information). For example, if the quantity of reference image blocks is 5, the quantity threshold may be set to 5. Similarly, the foregoing range threshold may be set according to a size of the reference image block.

Therefore, it can be further ensured that the requirement on memory bandwidth is reduced compared with the prior art.

Then, the optimal motion information may be determined from the N pieces of motion information according to the stored location range (the pixels in the location range).

That is, optionally, the candidate reference image block is at least two image blocks of the N reference image blocks, and the candidate motion information is at least two pieces of motion information of the N pieces of motion information, and reading the pixels in the location range, and performing encoding processing on the current image block according to the pixels in the location range includes reading the pixels in the location range according to the candidate motion information, to acquire the candidate reference image block, determining optimal motion information from the candidate motion information according to the candidate reference image block, and performing encoding processing on the current image block according to the optimal motion information.

Furthermore, the reference image block (information of pixels of each reference image block) corresponding to each piece of motion information can be acquired from the stored information of the pixels in the location range because the foregoing determined location range covers all the reference image blocks. Therefore, the optimal motion information may be determined from the pieces of motion information according to the reference image blocks. For example, evaluation may be performed based on information of pixels that is corresponding to each piece of motion information and by applying a pre-defined criterion (for example, a rate-distortion criterion), to obtain an evaluation value corresponding to each piece of motion information, and motion information with a minimum evaluation value is selected as the optimal motion information, that is, motion information for performing encoding processing (for example, motion compensation processing) on the current image block.

It should be understood that, the foregoing pre-defined criterion may be appropriately changed according to an applied encoding technology, and is not limited in the present disclosure. For example, in the DMVD technology, in a case of bidirectional prediction, each piece of motion information includes forward motion information and backward motion information, where the forward motion information is used to indicate a reference image block (referred to as a forward reference image block) in a forward reference image, and the backward motion information is used to indicate an reference image block (referred to as a backward reference image block) in a backward reference image, and motion information with a minimum sum-of-squared differences may be used as the optimal motion information if a sum of squared differences of pixel values at corresponding locations of the forward reference image block and the backward reference image block is used as a measurement criterion.

Then, the encoder side may use the optimal motion information to perform processing such as a motion compensation encoding operation on the target image block, to implement encoding on the current image block, generate a target data stream, and transmit the target data stream to the decoder side. Herein, a process and method of performing, by the encoder side, encoding processing on the current image block according to the optimal motion information may be similar to those in the prior art. To avoid repeated description, the description thereof is omitted herein.

Optionally, reading the pixels in the location range, and performing encoding processing on the current image block according to the pixels in the location range, to generate a target data stream includes reading the pixels in the location range, and performing encoding processing on the current image block according to the pixels in the location range, to generate the target data stream, where the target data stream includes second index information, and the second index information is used to indicate a location of the location range in the reference image.

Furthermore, in this embodiment of the present disclosure, after determining the location range as described above, the encoder side may further add information, that is, the second index information, for indicating the location of the location range in the reference image to the generated data stream, and the decoder side may directly determine the location range in the reference image according to the second index information. Therefore, burden of the decoder side can be reduced, power consumption of the decoder side can be reduced, and processing efficiency of the decoder side can be improved.

According to the image processing method in this embodiment of the present disclosure, a determined location range covers all reference images such that acquisition of optimal motion information can be ensured, an image processing effect can be improved, and user experience can be improved.

Manner 2

Optionally, the candidate reference image block is some image blocks of the N reference image blocks.

Furthermore, as limited by hardware of a device on the encoder side, for example, as limited by memory bandwidth, there may be a case in which currently available memory bandwidth cannot meet a requirement of the minimum public image block (an example of the location range) determined in the foregoing manner 1.

In view of the foregoing problem, this embodiment of the present disclosure provides the following technical solution, that is, a determined location range may cover only some reference image blocks (that is, an example of candidate reference image blocks). Assuming that a quantity of the covered reference image blocks is M, the following is met: $1 \leq M < N$.

Therefore, it can be ensured that the location range covers at least one complete reference image block, that is, at least one piece of motion information is available, and a requirement on memory bandwidth can be reduced on the premise of ensuring that encoding is performed on the current image block using the motion information.

In this case, an area (that is, the location range) may be determined in the reference image such that a range of the area can cover all pixels included by the M reference image blocks, that is, an area shown by dotted lines in FIG. 3B.

Optionally, determining candidate motion information from the N pieces of motion information according to a preset rule includes determining the candidate motion information from the N pieces of motion information according to available memory bandwidth and/or attribute information of an image to which the current image block belongs, where the attribute information is used to indicate at least one of the following parameters: definition of the image to which the current image block belongs, content of the image to which the current image block belongs, a source of the image to which the current image block belongs, or a production style of the image to which the current image block belongs.

Furthermore, in this embodiment of the present disclosure, the M candidate reference image blocks may be selected or motion information corresponding to the M candidate reference image blocks may be selected according to the available memory bandwidth and/or the attribute information of the image to which the current image block belongs.

The following separately describes methods for using the foregoing parameters.

A. Content of the image to which the current image block belongs, a source of the image to which the current image block belongs, and a production style of the image to which the current image block belongs.

For example, if an image is classified according to content, the image may be a news image, a sports image, a film-television image, and the like. Similarly, the image may also be classified according to a source and a production style. Optimal motion information (or an adjacent image block from which the optimal motion information comes) of an image of a same type is always the same. Therefore, in this embodiment of the present disclosure, statistics on high-priority motion information of an image of each type may be collected according to the content of the image to which the current image block belongs, the source of the image to which the current image block belongs, the production style of the image to which the current image block belongs, and the like, where the high-priority motion information has a largest probability of becoming optimal motion information of the image of this type.

Therefore, when the location range is being determined, it can be preferentially ensured that the location range covers a reference image block corresponding to the foregoing high-priority motion information.

Optionally, reading the pixels in the location range, and performing encoding processing on the current image block according to the pixels in the location range, to generate a target data stream includes reading the pixels in the location range, and performing encoding processing on the current image block according to the pixels in the location range, to generate the target data stream, where the target data stream includes first index information, and the first index information is used to indicate the candidate motion information.

After determining the high-priority motion information (that is, an example of the candidate motion information) as described above, the encoder side may further add information, that is, the first index information, for indicating the candidate motion information to the generated data stream, and the decoder side may directly determine the candidate motion information from the N pieces of motion information according to the first index information in order to determine a reference image block (that is, a candidate reference image block) corresponding to each piece of candidate motion information. Therefore, the location range may be determined in the reference image, and the location range can cover the candidate reference image block. Therefore, burden of the decoder side can be reduced, power consumption of the decoder side can be reduced, and processing efficiency of the decoder side can be improved.

B. Available memory bandwidth.

In this embodiment of the present disclosure, a size of a location range that can be read and stored may be determined according to a size of currently available memory bandwidth. Therefore, a quantity and a location of reference image blocks that can be covered may be determined according to the size of the location range. Therefore, a candidate reference image block and candidate motion information pointing to the candidate reference image block can be determined.

It should be noted that, there may be a case in which there are multiple combinations of reference image blocks covered by the location range if the currently available memory bandwidth is large enough. For example, for a location range of a same size, a quantity of reference image blocks that can be covered may be different if a location of the location range in the reference image is different, or for a location range of a same size, motion information corresponding to reference image blocks that can be covered is different if a location of the location range in the reference image is different.

In this case, a range that can cover maximum reference image blocks may be used as the location range for use. Therefore, a relatively high quantity of reference image blocks can be provided, and the motion information that is finally determined and is used for encoding processing can be optimized.

Alternatively, a range that can cover the reference image block corresponding to the foregoing determined high-priority motion information may be used as the location range for use. Therefore, it can be ensured that encoding processing is performed according to the high-priority motion information.

C. Definition of the image to which the current image block belongs.

Different image definition has a different requirement on hardware of the encoder side. For example, for an image with relatively high definition, in order to implement encoding on the image, it is usually required to configure hardware with relatively high performance, for example, relatively high memory bandwidth. Therefore, a size of a location range that can be stored is determined according to the definition of the image to which the current image block belongs, that is, the location range is larger if the definition is higher. Therefore, a quantity and a location of reference image blocks that can be covered may be determined according to the size of the location range. Therefore, a candidate reference image block and candidate motion information pointing to the candidate reference image block can be determined.

In a case in which the location range is determined according to the available memory bandwidth and the definition of the image to which the current image block belongs (or hardware performance of the encoder), the location range may be determined in the following manner, that is assuming that coordinates of the current image block in a current to-be-encoded image are (cur_x, cur_y), and that a size thereof is (blk_x)×(blk_y) pixels, and without loss of generality, in a reference image, a horizontal component of a motion vector is denoted by x, and a vertical component of the motion vector is denoted by y. In the reference image, MV#A may be written as {MV#A_x, MV#A_y}, MV#B may be written as {MV#B_x, MV#B_y}, MV#C may be written as {MV#C_x, MV#C_y}, MV#D may be written as {MV#D_x, MV#D_y}, and MV#T may be written as {MV#T_x, MV#T_y}.

Therefore, it may be determined that in each reference image block, minimum displacement Δx_min in a horizontal direction relative to a target image block equals min (MV#A_x, MV#B_x, MV#C_x, MV#D_x, MV#T_x), maximum displacement Δx_max in the horizontal direction relative to the target image block equals max(MV#A_x, MV#B_x, MV#C_x, MV#D_x, MV#T_x), minimum displacement Δy_min in a vertical direction relative to the target image block equals min(MV#A_y, MV#B_y, MV#C_y, MV#D_y, MV#T_y), and maximum displacement Δy_max in the vertical direction relative to the target image block equals max(MV#A_y, MV#B_y, MV#C_y, MV#D_y, MV#T_y).

With this definition, the location range that is read from the reference image at a time and is temporarily stored may be a rectangular area, where coordinates of a pixel at an upper left corner of the rectangular area are (cur_x+max(−Ωx_min, Δ_x_min), cur_y+max(−Ωy_min, Δ_y_min)), and coordinates of a pixel at a lower right corner of the rectangular area are (cur_x+blk_x+min(Ωx_max, Δx_max), cur_y+blk_y+min(Ωy_max, Δy_max), where values of Ωx_min, Ωx_max, Ωy_min, and Ωy_max may be determined according to the available memory bandwidth or the hardware performance of the encoder.

Optionally, reading the pixels in the location range, and performing encoding processing on the current image block according to the pixels in the location range, to generate a target data stream includes reading the pixels in the location range, and performing encoding processing on the current image block according to the pixels in the location range, to generate the target data stream, where the target data stream includes second index information, and the second index information is used to indicate a location of the location range in the reference image.

Furthermore, in this embodiment of the present disclosure, after determining the location range as described above, the encoder side may further add information, that is, the second index information, for indicating the location of the location range in the reference image to the generated data stream, and the decoder side may directly determine the location range in the reference image according to the second index information. Therefore, burden of the decoder side can be reduced, power consumption of the decoder side can be reduced, and processing efficiency of the decoder side can be improved.

For example rather than limitation, in this embodiment of the present disclosure, the second index information may be the foregoing values of Ωx_min, Ωx_max, Ωy_min, and Ωy_max. In addition, the second index information may be identified at a different location of the data stream using a suitable syntax element, for example, may be identified in a picture parameter set (PPS) or a slice header. Because frequency at which the picture parameter set or the slice header appears in the data stream is relatively low, an effect of extra bandwidth caused by identifying the foregoing values of Ωx_min, Ωx_max, Ωy_min, and Ωy_max at these locations may be almost ignored.

After the location range is determined as described above, information (such as a pixel value) of each pixel in the location range may be read and stored in a memory.

In addition, when the location range can cover only one complete reference image block (that is, the candidate reference image block), encoding processing may be performed on the current image block by directly using the candidate reference image block and motion information corresponding to the candidate reference image block.

When the location range can cover at least two complete reference image blocks (that is, candidate reference image blocks), optimal motion information may be determined, according to the stored location range (the pixels in the location range), from motion information corresponding to the at least two candidate reference image blocks.

That is, optionally, the candidate reference image block is at least two image blocks of the N reference image blocks, and the candidate motion information is at least two pieces of motion information of the N pieces of motion information, and reading the pixels in the location range, and performing encoding processing on the current image block according to the pixels in the location range includes reading the pixels in the location range according to the candidate motion information, to acquire the candidate reference image block, determining optimal motion information from the candidate motion information according to the candidate reference image block, and performing encoding processing on the current image block according to the optimal motion information.

Furthermore, because the foregoing determined location range covers at least two reference image blocks, a candidate reference image block (information of pixels of each reference image block) corresponding to each piece of candidate motion information can be acquired from the stored information of the pixels in the location range. Therefore, the optimal motion information may be determined from the candidate motion information. For example, evaluation may be performed based on information of pixels that is corresponding to the candidate motion information and by applying a pre-defined criterion, to obtain an evaluation value corresponding to each piece of candidate motion information, and candidate motion information with a minimum evaluation value is selected as the optimal motion information, that is, motion information for performing encoding processing (for example, motion compensation processing) on the current image block.

Then, the encoder side may use the optimal motion information to perform processing such as a motion compensation encoding operation on the target image block, to implement encoding on the current image block, generate a target data stream, and transmit the target data stream to the decoder side. Herein, a process and method of performing, by the encoder side, encoding processing on the current image block according to the optimal motion information may be similar to those in the prior art. To avoid repeated description, the description thereof is omitted herein.

According to the image processing method in this embodiment of the present disclosure, a location range is determined in a reference image such that the location range covers pixels corresponding to at least one piece of motion information, and in a case in which pixels in the foregoing location range are read into a memory at a time, optimal motion information can be determined from the at least one piece of motion information instead of separately reading corresponding pixels for each piece of motion information. Therefore, a requirement on memory bandwidth can be reduced, and a system requirement and costs can be reduced.

FIG. 4 shows a schematic flowchart of an image processing method 200, described from a perspective of a decoder side, according to an embodiment of the present disclosure. As shown in FIG. 4, the method 200 includes the following steps.

Step S210: Acquire N pieces of motion information from N adjacent image blocks adjacent to a current image block, where the N adjacent image blocks are in a one-to-one correspondence with the N pieces of motion information, the N pieces of motion information are used to indicate N reference image blocks in a reference image of the current image block, and the N pieces of motion information are in a one-to-one correspondence with the N reference image blocks.

Step S220: Determine, in the reference image, a location range of a to-be-stored pixel, and store all pixels in the location range, where the location range covers all pixels of a candidate reference image block, and the candidate reference image block is at least one image block of the N reference image blocks.

Step S230: Read the pixels in the location range according to candidate motion information of the motion information, and perform decoding processing on a target data stream according to the pixels in the location range, to reconstruct the current image block, where the candidate motion information is motion information corresponding to the candidate reference image block.

Furthermore, the decoder side may acquire N pieces of motion information, where N is a positive integer.

In this embodiment of the present disclosure, the motion information may include one or more of a prediction direction, a reference image index, or a motion vector, where the prediction direction may include unidirectional prediction and bidirectional prediction, and unidirectional prediction may include forward prediction and backward prediction.

Forward prediction refers to generating a prediction signal using a reference image in a forward reference image list, that is, a list 0.

Backward prediction refers to generating a prediction signal using a reference image in a backward reference image list, that is, a list 1. Bidirectional prediction refers to generating a prediction signal by simultaneously using a reference image in the list 0 and a reference image in the list 1.

For unidirectional prediction, a reference image index is required to indicate a reference image selected from the list 0 or the list 1. For bidirectional prediction, two reference image indexes are required to respectively indicate a reference image selected from the list 0 and a reference image selected from the list 1.

Each motion vector includes a horizontal direction component x and a vertical direction component y, which may be denoted by (x, y). For unidirectional prediction, a motion vector is required to indicate displacement of a prediction signal in a reference image selected from the list 0 or the list 1. For bidirectional prediction, two motion vectors are required to respectively indicate displacement of a forward prediction signal and a backward prediction signal in a reference image selected from the list 0 and a reference image selected from the list 1.

In this embodiment of the present disclosure, the motion information refers to motion information acquired from an adjacent image block of the current image block (that is, a to-be-encoded image block for an encoder side, and for a decoder side, an image block to be decoded and reconstructed). In this embodiment of the present disclosure, the motion information may include spatial motion information and temporal motion information.

The spatial motion information is motion information acquired from a spatially adjacent block of the current image block, and the temporal motion information refers to motion information acquired from a temporally adjacent block.

FIG. 2A shows a source location of spatial motion information in a DMVD technology, and FIG. 2B shows a source location of temporal motion information in a DMVD technology.

As shown in FIG. 2A, in the DMVD technology, the spatial motion information may include motion information of an image block A (an example of an adjacent block) on a left side of the current image block, where the motion information is denoted by MV#A below, motion information of an image block B (another example of an adjacent block) on an upper side of the current image block, where the motion information is denoted by MV#B below, motion information of an image block C (another example of an adjacent block) on an upper right side of the current image block, where the motion information is denoted by MV#C below, and motion information of an image block D (another example of an adjacent block) on an upper left side of the current image block, where the motion information is denoted by MV#D below.

It should be noted that, when a prediction direction is unidirectional, a piece of motion information may indicate a reference block in a reference image, and when a prediction direction is bidirectional, a piece of motion information may indicate a reference block in a forward reference image and a reference block in a backward reference image.

As shown in FIG. 2B, in the DMVD technology, the temporal motion information may include for example, motion information acquired by performing panning processing on MV#T' based on the current image block, where the motion information is denoted by MV#T below, and MV#T' is motion information of an image block E (another example of an adjacent block) that is in a backward reference image and is at a location corresponding to the current image block.

Therefore, the decoder side can obtain a motion information set (or a motion information list) including the foregoing five pieces of motion information, that is, an example of the N pieces of motion information, where the motion information set is denoted by:

{MV#A, MV#B, MV#C, MV#D, MV#T}.

It should be noted that, if the foregoing acquired motion information is repeated, the repeated motion information may be deleted, to ensure that the N pieces of motion information are different from each other.

It should be understood that, the foregoing illustrated method for acquiring the N pieces of motion information is merely for exemplary description, and the present disclosure is not limited thereto. A different acquisition method may be used according to a technology to which the image processing method in this embodiment of the present disclosure is applicable, which is not further limited in the present disclosure.

After determining the N pieces of motion information as described above, the decoder side may determine a reference image block corresponding to each piece of motion information (or a reference image block to which each piece of motion information points) from a reference image. It should be noted herein that, in a case in which a prediction direction is bidirectional, the decoder side needs to respectively determine a reference image block corresponding to each motion information from the two reference images (the forward reference image and the backward reference image). For ease of understanding and description and without loss of generality, description is provided below using processing on the backward reference image as an example.

Then, the decoder side needs to determine a piece of motion information (referred to as target motion information below for ease of understanding and differentiation) from the N pieces of motion information in order to perform decoding processing, and further, motion compensation processing according to the target motion information. The process is described subsequently in detail.

In this embodiment of the present disclosure, the target motion information may be calculated in a calculation manner according to a preset rule (that is, a manner 3), or the target motion information may be determined according to an attribute of the current image block and/or device performance (that is, a manner 4). Processing in the foregoing two cases is described separately below in detail.

Manner 3

Optionally, the candidate reference image block is all image blocks of the N reference image blocks.

In this embodiment of the present disclosure, optimal motion information may be determined from the N pieces of motion information (an example of the candidate motion information) in a calculation manner, and the optimal motion information is used as the foregoing target motion information. In a calculation process, it is required to acquire reference image blocks (an example of candidate reference image blocks) corresponding to the N pieces of motion information (reference image blocks to which motion vectors point), and calculation is performed based on the reference image blocks (pixel values of pixels in the reference image blocks).

Therefore, in this embodiment of the present disclosure, the decoder side may determine location distribution of pixels (that is, each reference image block) in the reference image, where the pixels need to be stored and are used for subsequent processing.

Because each piece of the foregoing determined motion information is acquired from an adjacent (temporally adjacent and/or spatially adjacent) image block of a current image block that needs to be decoded, there is relatively strong correlation (or similarity) between the pieces of motion information (motion vectors). Therefore, as shown in FIG. 3A and FIG. 3B, an outward manifestation is that the reference image blocks overlap, or multiple reference image blocks include a pixel at a same location.

In the prior art, a decoder side needs to separately acquire, from a reference image, a reference image block to which each piece of motion information points, and independently store each reference image block (pixel values in the reference image block) in memory space, to determine optimal motion information from N pieces of motion information based on each reference image block. Therefore, it is required that memory bandwidth of a device can meet reading and storage of N reference image blocks, and a case in which the foregoing overlapping area is stored for multiple times may occur, resulting in a relatively high requirement on the memory bandwidth.

In contrast, in this embodiment of the present disclosure, an area (that is, a location range) may be determined from the reference image based on a feature that there is relatively strong correlation and similarity between the foregoing determined N pieces of motion information such that a range of the area can cover all pixels included by the N reference image blocks. For example rather than limitation, for example, a minimum public image block, that is, an area shown by dotted lines in FIG. 3A, of the N reference image blocks may be used as the location range.

The minimum public image block may be determined in the following manner, that is assuming that coordinates of the current image block in a current to-be-reconstructed image are (cur_x, cur_y), and that a size thereof is (blk_x)× (blk_y) pixels, and without loss of generality, in a reference image, a horizontal component of a motion vector is denoted by x, and a vertical component of the motion vector is denoted by y. In the reference image, MV#A may be written as {MV#A_x, MV#A_y}, MV#B may be written as {MV#B_x, MV#B_y}, MV#C may be written as {MV#C_x, MV#C_y}, MV#D may be written as {MV#D_x, MV#D_y}, and MV#T may be written as {MV#T_x, MV#T_y}.

Therefore, it may be determined that in each reference image block, minimum displacement Δx_min in a horizontal direction relative to a target image block equals min(MV#A_x, MV#B_x, MV#C_x, MV#D_x, MV#T_x), maximum displacement Δx_max in the horizontal direction relative to the target image block equals max(MV#A_x, MV#B_x, MV#C_x, MV#D_x, MV#T_x), minimum displacement Δy_min in a vertical direction relative to the target image block equals min(MV#A_y, MV#B_y, MV#C_y, MV#D_y, MV#T_y), and maximum displacement Δy_max in the vertical direction relative to the target image block equals max(MV#A_y, MV#B_y, MV#C_y, MV#D_y, MV#T_y).

With this definition, the location range that is read from the reference image at a time and is temporarily stored may be a rectangular area, where coordinates of a pixel at an upper left corner of the rectangular area are (cur_x+Δx_min, cur_y+Δy_min), and coordinates of a pixel at a lower right corner of the rectangular area are (cur_x+Δx_max+blk_x, cur_y+Δy_max+blk_y).

Therefore, information (such as a pixel value) of each pixel in the location range may be read and stored in a memory, for use in subsequent processing of determining the optimal motion information.

Optionally, before determining, in the reference image, a location range of a to-be-stored pixel according to the candidate motion information of the motion information, the method further includes determining that at least two reference image blocks of the N reference image blocks overlap with each other.

After each reference image block is determined as described above, it may be first determined whether reference images overlap with each other, if the reference images overlap, the foregoing process of determining the location range and storing the information of the pixels in the location range may be executed.

Therefore, it can be ensured that a requirement on memory bandwidth is reduced compared with the prior art.

Optionally, before determining, in the reference image, a location range of a to-be-stored pixel according to the candidate motion information of the motion information, the method further includes determining that at least two reference image blocks of the N reference image blocks overlap with each other, and a quantity of overlapped reference image blocks is greater than or equal to a preset quantity threshold, or an overlapping range is greater than or equal to a preset range threshold.

After each reference image block is determined as described above, it may be first determined whether the reference images overlap with each other, and if the reference images overlap, a feature of an overlapping area (for example, a quantity of overlapped reference image blocks and/or a size of an overlapping range) may be further determined, and if the feature of the foregoing overlapping area meets a preset condition, for example, the quantity of overlapped reference image blocks is greater than or equal to a preset quantity threshold, and/or the overlapping range is greater than or equal to a preset range threshold), the foregoing process of determining the location range and storing the information of the pixels in the location range may be executed. It should be noted that, the foregoing quantity threshold may be set according to a quantity of reference image blocks (or a quantity of pieces of motion information). For example, if the quantity of reference image blocks is 5, the quantity threshold may be set to 5. Similarly, the foregoing range threshold may be set according to a size of the reference image block.

Therefore, it can be further ensured that the requirement on memory bandwidth is reduced compared with the prior art.

Then, the optimal motion information may be determined from the N pieces of motion information according to the stored location range (the pixels in the location range).

That is, optionally, the candidate reference image block is at least two image blocks of the N reference image blocks, and the candidate motion information is at least two pieces of motion information of the N pieces of motion information, and reading the pixels in the location range according to candidate motion information of the motion information, and performing decoding processing on a target data stream according to the pixels in the location range includes determining the candidate motion information from the N pieces of motion information, reading the pixels in the location range according to the candidate motion information, to acquire the candidate reference image block, determining optimal motion information from the candidate motion information according to the candidate reference image block, and performing decoding processing on the target data stream according to the optimal motion information.

Furthermore, the reference image block (information of pixels of each reference image block) corresponding to each piece of motion information can be acquired from the stored information of the pixels in the location range because the foregoing determined location range covers all the reference image blocks. Therefore, the optimal motion information may be determined from the pieces of motion information according to the reference image blocks. For example, evaluation may be performed based on information of pixels that is corresponding to each piece of motion information and by applying a pre-defined criterion (for example, a rate-distortion criterion), to obtain an evaluation value corresponding to each piece of motion information, and motion information with a minimum evaluation value is selected as the optimal motion information, that is, motion information for performing decoding and reconstruction processing (for example, motion compensation processing) on the current image block.

It should be understood that, the foregoing pre-defined criterion may be appropriately changed according to an applied decoding technology, and is not limited in the present disclosure. For example, in the DMVD technology, in a case of bidirectional prediction, each piece of motion information includes forward motion information and backward motion information, where the forward motion information is used to indicate a reference image block (referred to as a forward reference image block) in a forward reference image, and the backward motion information is used to indicate an image block (referred to as a backward reference image block) in a backward reference image, and if a sum of squared differences of pixel values at corresponding locations of the forward reference image block and the backward reference image block is used as a measurement criterion, motion information with a minimum sum of squared differences may be used as the optimal motion information.

Then, the decoder side may use the optimal motion information to perform processing such as a motion compensation decoding operation on the data stream from the encoder side, to implement reconstruction on the current image block. Herein, a process and method of performing, by the decoder side, decoding processing on the current image block according to the optimal motion information may be similar to those in the prior art. To avoid repeated description, the description thereof is omitted herein.

Optionally, determining, in the reference image, a location range of a to-be-stored pixel includes acquiring second index information from the target data stream, where the second index information is used to indicate a location and a coverage range of the location range in the reference image, and determining the location range in the reference image according to the second index information.

Furthermore, in this embodiment of the present disclosure, the encoder side may add information, that is, the second index information, for indicating the location and the range of the location range in the reference image to the data stream. Therefore, the decoder side may acquire the second index information from the data stream, and directly determine the location range (a pixel that needs to be stored in a memory) in the reference image according to the second index information. Therefore, burden of the decoder side can be reduced, power consumption of the decoder side can be reduced, and processing efficiency of the decoder side can be improved.

According to the image processing method in this embodiment of the present disclosure, a determined location range covers all reference images such that acquisition of optimal motion information can be ensured, an image processing effect can be improved, and user experience can be improved.

Manner 4

Optionally, the candidate reference image block is some image blocks of the N reference image blocks.

Furthermore, as limited by hardware of a device on the decoder side, for example, as limited by memory bandwidth, there may be a case in which currently available memory bandwidth cannot meet a requirement of the minimum public image block (an example of the location range) determined in the foregoing manner 3.

In view of the foregoing problem, this embodiment of the present disclosure provides the following technical solution, that is, a determined location range may cover only some reference image blocks (that is, an example of candidate reference image blocks). Assuming that a quantity of the covered reference image blocks is M, the following is met: $1 \leq M < N$.

Therefore, it can be ensured that the location range covers at least one complete reference image block, that is, at least one piece of motion information is available, and a requirement on memory bandwidth can be reduced on the premise of ensuring that decoding and reconstruction are performed on the current image block using the motion information.

In this case, an area (that is, the location range) may be determined in the reference image such that a range of the area can cover all pixels included by the M reference image blocks, that is, an area shown by dotted lines in FIG. 3B.

Optionally, determining, in the reference image, a location range of a to-be-stored pixel according to candidate motion information of the N pieces of motion information includes determining the candidate motion information from the N pieces of motion information according to available memory bandwidth and/or attribute information of an image to which the current image block belongs, and determining the location range in the reference image according to the candidate motion information, where the attribute information is used to indicate at least one of the following parameters: definition of the image to which the current image block belongs, content of the image to which the current image block belongs, a source of the image to which the current image block belongs, or a production style of the image to which the current image block belongs.

Furthermore, in this embodiment of the present disclosure, the M candidate reference image blocks may be selected or motion information corresponding to the M candidate reference image blocks may be selected according to the available memory bandwidth and/or the attribute information of the image to which the current image block belongs.

The following separately describes methods for using the foregoing parameters.

A. Content of the image to which the current image block belongs, a source of the image to which the current image block belongs, and a production style of the image to which the current image block belongs.

For example, if an image is classified according to content, the image may be a news image, a sports image, a film-television image, and the like. Similarly, the image may also be classified according to a source and a production style. Optimal motion information (or an adjacent image block from which the optimal motion information comes) of an image of a same type is always the same. Therefore, in this embodiment of the present disclosure, statistics on high-priority motion information of an image of each type may be collected according to the content of the image to which the current image block belongs, the source of the image to which the current image block belongs, the production style of the image to which the current image block belongs, and the like, where the high-priority motion information has a largest probability of becoming optimal motion information of the image of this type.

Therefore, when the location range is being determined, it can be preferentially ensured that the location range covers a reference image block corresponding to the foregoing high-priority motion information.

Optionally, determining the candidate motion information from the N pieces of motion information includes acquiring first index information from the target data stream, where the first index information is used to indicate the candidate motion information, and determining the candidate motion information from the N pieces of motion information according to the first index information.

Furthermore, the encoder side may add information, that is, the first index information, for indicating information about the candidate motion information to the generated data stream, and the decoder side acquires the first index information from the data stream, and directly determines the candidate motion information from the N pieces of motion information according to the first index information in order to determine a reference image block (that is, a candidate reference image block) corresponding to each piece of candidate motion information. Therefore, the location range may be determined in the reference image, and the location range can cover the candidate reference image block. Therefore, burden of the decoder side can be reduced, power consumption of the decoder side can be reduced, and processing efficiency of the decoder side can be improved.

B. Available memory bandwidth.

In this embodiment of the present disclosure, a size of a location range that can be read and stored may be determined according to a size of currently available memory bandwidth. Therefore, a quantity and a location of reference image blocks that can be covered may be determined according to the size of the location range. Therefore, a candidate reference image block and motion information pointing to the candidate reference image block can be determined.

It should be noted that, there may be a case in which there are multiple combinations of reference image blocks covered by the location range if the currently available memory bandwidth is large enough. For example, for a location range of a same size, a quantity of reference image blocks that can be covered may be different if a location of the location range in the reference image is different, or for a location range of a same size, motion information corresponding to reference image blocks that can be covered is different if a location of the location range in the reference image is different.

In this case, a range that can cover maximum reference image blocks may be used as the location range for use. Therefore, a relatively high quantity of reference image blocks can be provided, and the motion information that is finally determined and is used for decoding processing can be optimized.

Alternatively, a range that can cover the reference image block corresponding to the foregoing determined high-priority motion information may be used as the location range for use. Therefore, it can be ensured that decoding processing is performed according to the high-priority motion information.

C. Definition of the image to which the current image block belongs.

Different image definition has a different requirement on hardware of the decoder side. For example, for an image with relatively high definition, in order to implement decoding on the image, it is usually required to configure hardware with relatively high performance, for example, relatively high memory bandwidth. Therefore, a size of a location range that can be stored is determined according to the definition of the image to which the current image block belongs, that is, the location range is larger if the definition is higher. Therefore, a quantity and a location of reference image blocks that can be covered may be determined according to the size of the location range. Therefore, a candidate reference image block and motion information pointing to the candidate reference image block can be determined.

In a case in which the location range is determined according to the available memory bandwidth and the definition of the image to which the current image block belongs (or hardware performance of the decoder), the location range may be determined in the following manner, that is assuming that coordinates of the current image block in a current image are (cur_x, cur_y), and that a size thereof is (blk_x)×(blk_y) pixels, and without loss of generality, in a reference image, a horizontal component of a motion vector is denoted by x, and a vertical component of the motion vector is denoted by y. In the reference image, MV#A may be written as {MV#A_x, MV#A_y}, MV#B may be written as {MV#B_x, MV#B_y}, MV#C may be written as {MV#C_x, MV#C_y}, MV#D may be written as {MV#D_x, MV#D_y}, and MV#T may be written as {MV#T_x, MV#T_y}.

Therefore, it may be determined that in each reference image block, minimum displacement Δx_min in a horizontal direction relative to a target image block equals min(MV#A_x, MV#B_x, MV#C_x, MV#D_x, MV#T_x), maximum displacement Δx_max in the horizontal direction relative to the target image block equals max(MV#A_x, MV#B_x, MV#C_x, MV#D_x, MV#T_x), minimum displacement Δy_min in a vertical direction relative to the target image block equals min(MV#A_y, MV#B_y, MV#C_y, MV#D_y, MV#T_y), and maximum displacement Δy_max in the vertical direction relative to the target image block equals max(MV#A_y, MV#B_y, MV#C_y, MV#D_y, MV#T_y).

With this definition, the location range that is read from the reference image at a time and is temporarily stored may be a rectangular area, where coordinates of a pixel at an upper left corner of the rectangular area are (cur_x+max(-Ωx_min, Δ_x_min), cur_y+max(-Ωy_min, Δ_y_min)), and coordinates of a pixel at a lower right corner of the rectangular area are (cur_x+blk_x+min(Ωx_max, Δx_max), cur_y+blk_y+min(Ωy_max, Δy_max), where values of Ωx_min, Ωx_max, Ωy_min, and Ωy_max may be determined according to the available memory bandwidth or the hardware performance of the decoder.

Optionally, determining, in the reference image, a location range of a to-be-stored pixel includes acquiring second index information from the target data stream, where the second index information is used to indicate a location and a coverage range of the location range in the reference image, and determining the location range in the reference image according to the second index information.

Furthermore, in this embodiment of the present disclosure, the encoder side may add information, that is, the second index information, for indicating the location and the range (or covered pixels) of the location range in the reference image to the generated data stream. Therefore, the decoder side acquires the second index information from the data stream, and directly determines the location range in the reference image according to the second index information. Therefore, burden of the decoder side can be reduced, power consumption of the decoder side can be reduced, and processing efficiency of the decoder side can be improved.

For example rather than limitation, in this embodiment of the present disclosure, the second index information may be the foregoing values of Ωx_min, Ωx_max, Ωy_min, and Ωy_max. In addition, the second index information may be identified at a different location of the data stream using a suitable syntax element, for example, may be identified in a PPS or a slice header. Because frequency at which the picture parameter set or the slice header appears in the data stream is relatively low, an effect of extra bandwidth caused by identifying the foregoing values of Ωx_min, Ωx_max, Ωy_min, and Ωy_max at these locations may be almost ignored.

After the location range is determined as described above, information (such as a pixel value) of each pixel in the location range may be read and stored in a memory.

In addition, when the location range can cover only one complete reference image block (that is, the candidate reference image block), decoding processing may be performed on the current block by directly using the candidate reference image block and motion information corresponding to the candidate reference image block.

When the location range can cover at least two complete reference image blocks (that is, candidate reference image blocks), optimal motion information may be determined, according to the stored location range (the pixels in the location range), from motion information corresponding to the at least two candidate reference image blocks.

That is, optionally, the candidate reference image block is at least two image blocks of the N reference image blocks, and the candidate motion information is at least two pieces of motion information of the N pieces of motion information, and reading the pixels in the location range according to candidate motion information of the motion information, and performing decoding processing on a target data stream according to the pixels in the location range includes determining the candidate motion information from the N pieces of motion information, reading the pixels in the location range according to the candidate motion information, to acquire the candidate reference image block, determining optimal motion information from the candidate motion information according to the candidate reference image block, and performing decoding processing on the target data stream according to the optimal motion information.

Further, a candidate reference image block (information of pixels of each reference image block) corresponding to each piece of candidate motion information can be acquired from the stored information of the pixels in the location range because the foregoing determined location range covers at least two reference image blocks. Therefore, the optimal motion information may be determined from the candidate motion information. For example, evaluation may be performed based on information of pixels that is corresponding to the candidate motion information and by applying a pre-defined criterion, to obtain an evaluation value corresponding to each piece of candidate motion information, and candidate motion information with a minimum evaluation value is selected as the optimal motion information, that is, motion information for performing decoding processing (for example, motion compensation processing) on the current image block.

Then, the decoder side may use the optimal motion information to perform processing such as a motion compensation decoding operation on the data stream, to implement reconstruction on the current image block. Herein, a process and method of performing, by the decoder side, decoding processing on the current image block according to the optimal motion information may be similar to those in the prior art. To avoid repeated description, the description thereof is omitted herein.

According to the image processing method in this embodiment of the present disclosure, a location range is determined in a reference image such that the location range covers pixels corresponding to at least one piece of motion information, and in a case in which pixels in the foregoing location range are read into a memory at a time, optimal motion information can be determined from the at least one piece of motion information instead of separately reading corresponding pixels for each piece of motion information. Therefore, a requirement on memory bandwidth can be reduced, and a system requirement and costs can be reduced.

Figure 5:
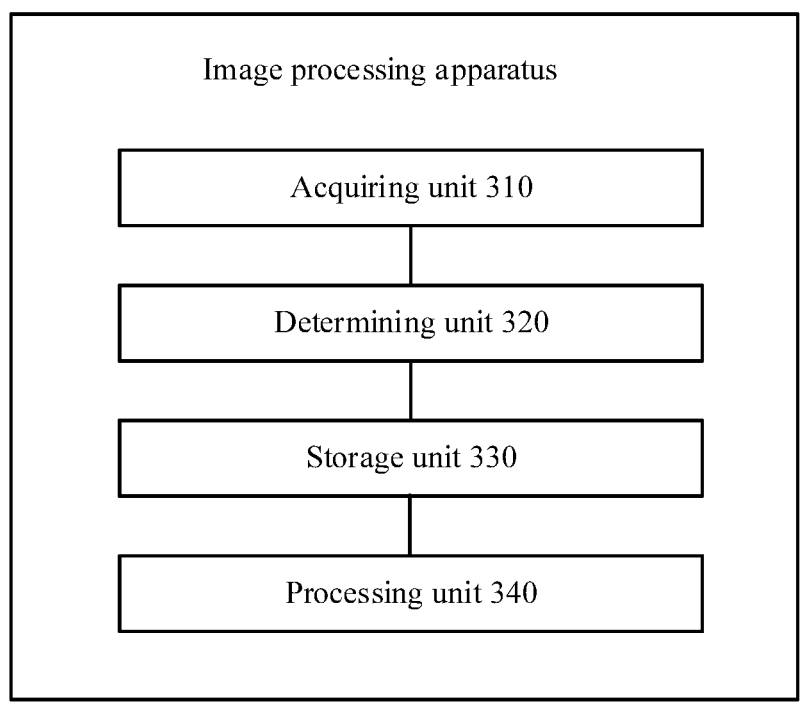
FIG. 5 is a schematic block diagram of an image processing apparatus according to an embodiment of the present disclosure.
Figure 6:
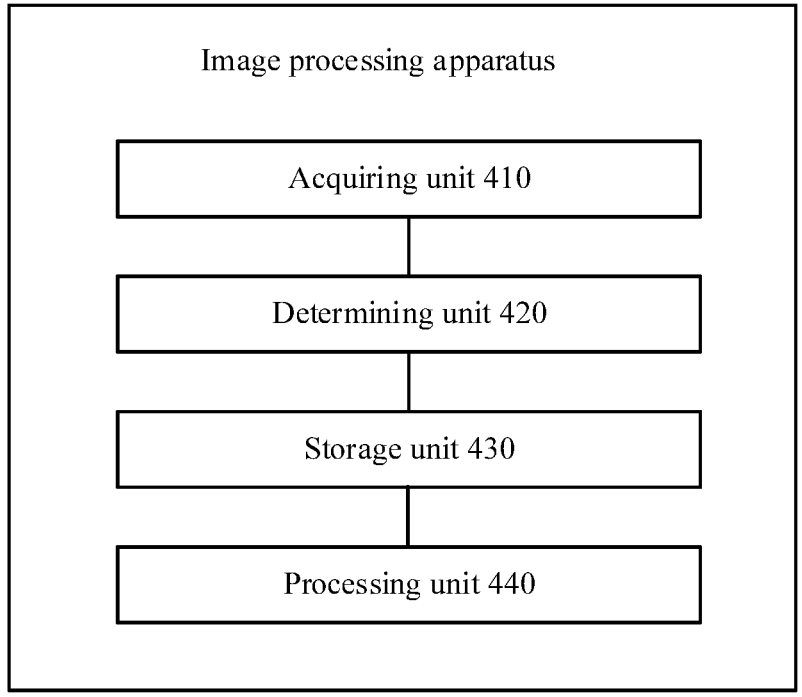
FIG. 6 is a schematic block diagram of an image processing apparatus according to another embodiment of the present disclosure.

The foregoing describes in detail the image processing methods according to the embodiments of the present disclosure with reference to FIG. 1, FIG. 2A, FIG. 2B, FIG. 3A, FIG. 3B, and FIG. 4, and the following describes in detail image processing apparatuses according to embodiments of the present disclosure with reference to FIG. 5 and FIG. 6.

FIG. 5 shows a schematic block diagram of an image processing apparatus 300 according to an embodiment of the present disclosure. As shown in FIG. 5, the apparatus 300 includes an acquiring unit 310 configured to acquire N pieces of motion information from N adjacent image blocks adjacent to a current image block, where the N adjacent image blocks are in a one-to-one correspondence with the N pieces of motion information, the N pieces of motion information are used to indicate N reference image blocks in a reference image of the current image block, and the N pieces of motion information are in a one-to-one correspondence with the N reference image blocks, a determining unit 320 configured to determine candidate motion information from the N pieces of motion information according to a preset rule, where the candidate motion information is at least one piece of information of the N pieces of motion information, and determine, in the reference image, a location range of a to-be-stored pixel according to the candidate motion information, where the location range covers all pixels of a candidate reference image block, the candidate reference image block is at least one image block of the N reference image blocks, and the candidate motion information is motion information corresponding to the candidate reference image block, a storage unit 330 configured to store all pixels in the location range, and a processing unit 340 configured to read the pixels in the location range from the storage unit 330, and perform encoding processing on the current image block according to the pixels in the location range, to generate a target data stream.

Optionally, the candidate reference image block is at least two image blocks of the N reference image blocks, the candidate motion information is at least two pieces of motion information of the N pieces of motion information, and the processing unit 340 is further configured to read the pixels in the location range from the storage unit 330 according to the candidate motion information, to acquire the candidate reference image block, determine optimal motion information from the candidate motion information according to the candidate reference image block, and perform encoding processing on the current image block according to the optimal motion information.

Optionally, the candidate reference image block is some image blocks of the N reference image blocks.

Optionally, the determining unit 320 is further configured to determine the candidate motion information from the N pieces of motion information according to available memory bandwidth and/or attribute information of an image to which the current image block belongs, and determine the location range in the reference image according to the candidate motion information, where the attribute information is used to indicate at least one of the following parameters: definition of the image to which the current image block belongs, content of the image to which the current image block belongs, a source of the image to which the current image block belongs, or a production style of the image to which the current image block belongs.

Optionally, the processing unit 340 is further configured to read the pixels in the location range from the storage unit 330, and perform encoding processing on the current image block according to the pixels in the location range, to generate the target data stream, where the target data stream includes first index information, and the first index information is used to indicate the candidate motion information.

Optionally, the processing unit 340 is further configured to read the pixels in the location range from the storage unit 330, and perform encoding processing on the current image block according to the pixels in the location range, to generate the target data stream, where the target data stream includes second index information, and the second index information is used to indicate a location and a coverage range of the location range in the reference image.

Optionally, the candidate reference image block is all image blocks of the N reference image blocks.

The image processing apparatus 300 according to this embodiment of the present disclosure may correspond to the encoder side in the method of the embodiment of the present disclosure, and the foregoing and other operations and/or functions of each unit, that is, each module, of the image processing apparatus 300 are separately intended for implementing the corresponding process of the method 100 in FIG. 1, and details are not described herein again for brevity.

According to the image processing apparatus in this embodiment of the present disclosure, a location range is determined in a reference image such that the location range covers pixels corresponding to at least one piece of motion information, and in a case in which pixels in the foregoing location range are read into a memory at a time, optimal motion information can be determined from the at least one piece of motion information instead of separately reading corresponding pixels for each piece of motion information. Therefore, a requirement on memory bandwidth can be reduced, and a system requirement and costs can be reduced.

FIG. 6 shows a schematic block diagram of an image processing apparatus 400 according to an embodiment of the present disclosure. As shown in FIG. 6, the apparatus 400 includes an acquiring unit 410 configured to acquire N pieces of motion information from N adjacent image blocks adjacent to a current image block, where the N adjacent image blocks are in a one-to-one correspondence with the N pieces of motion information, the N pieces of motion information are used to indicate N reference image blocks in a reference image of the current image block, and the N pieces of motion information are in a one-to-one correspondence with the N reference image blocks, a determining unit 420 configured to determine, in the reference image, a location range of a to-be-stored pixel, where the location range covers all pixels of a candidate reference image block, and the candidate reference image block is at least one image block of the N reference image blocks, a storage unit 430 configured to store all pixels in the location range, and a processing unit 440 configured to read the pixels in the location range from the storage unit 430 according to candidate motion information of the motion information, and perform decoding processing on a target data stream according to the pixels in the location range, to reconstruct the current image block, where the candidate motion information is motion information corresponding to the candidate reference image block.

Optionally, the candidate reference image block is at least two image blocks of the N reference image blocks, the candidate motion information is at least two pieces of motion information of the N pieces of motion information, and the determining unit 420 is further configured to determine the candidate motion information from the N pieces of motion information, and the processing unit 440 is further configured to acquire the candidate motion information from the determining unit 420, read the pixels in the location range according to the candidate motion information, to acquire the candidate reference image block, determine optimal motion information from the candidate motion information according to the candidate reference image block, and perform decoding processing on the target data stream according to the optimal motion information.

Optionally, the candidate reference image block is all image blocks of the N reference image blocks.

Optionally, the candidate reference image block is some image blocks of the N reference image blocks.

Optionally, the determining unit 420 is further configured to determine the candidate motion information from the N pieces of motion information, and determine the location range in the reference image according to the candidate motion information.

Optionally, the determining unit 420 is further configured to determine the candidate motion information from the N pieces of motion information according to available memory bandwidth and/or attribute information of an image to which the current image block belongs, where the attribute information is used to indicate at least one of the following parameters: definition of the image to which the current image block belongs, content of the image to which the current image block belongs, a source of the image to which the current image block belongs, or a production style of the image to which the current image block belongs.

Optionally, the determining unit 420 is further configured to acquire first index information from the target data stream, and determine the candidate motion information from the N pieces of motion information according to the first index information, where the first index information is used to indicate the candidate motion information.

Optionally, the determining unit 420 is further configured to acquire second index information from the target data stream, and determine the location range in the reference image according to the second index information, where the second index information is used to indicate a location and a coverage range of the location range in the reference image.

The image processing apparatus 400 according to this embodiment of the present disclosure may correspond to the decoder side in the method of the embodiment of the present disclosure, and the foregoing and other operations and/or functions of each unit, that is, each module, of the image processing apparatus 400 are separately intended for implementing the corresponding process of the method 200 in FIG. 4, and details are not described herein again for brevity.

According to the image processing apparatus in this embodiment of the present disclosure, a location range is determined in a reference image such that the location range covers pixels corresponding to at least one piece of motion information, and in a case in which pixels in the foregoing location range are read into a memory at a time, optimal motion information can be determined from the at least one piece of motion information instead of separately reading corresponding pixels for each piece of motion information. Therefore, a requirement on memory bandwidth can be reduced, and a system requirement and costs can be reduced.

Figure 7:
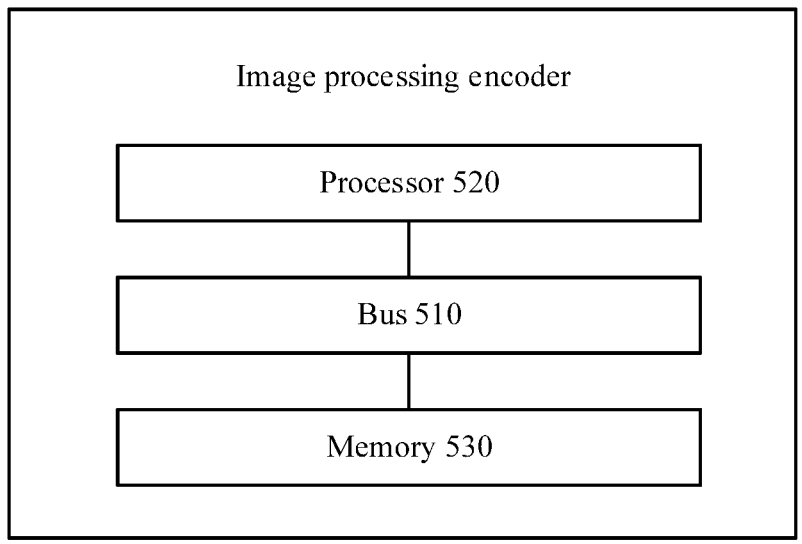
FIG. 7 is a schematic structural diagram of an image processing encoder according to an embodiment of the present disclosure.
Figure 8:
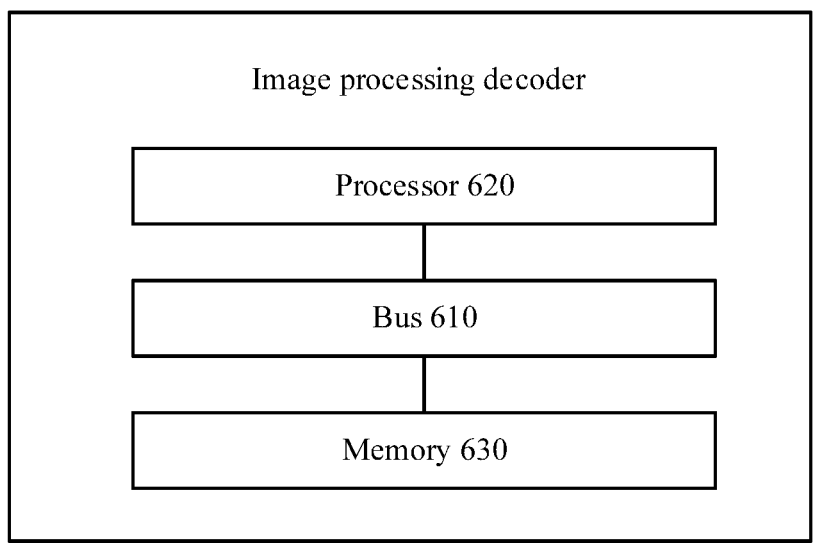
FIG. 8 is a schematic structural diagram of an image processing decoder according to another embodiment of the present disclosure.

The foregoing describes in detail the image processing methods according to the embodiments of the present disclosure with reference to FIG. 1, FIG. 2A, FIG. 2B, FIG. 3A, FIG. 3B, and FIG. 4, and the following describes in detail an image processing encoder and decoder according to embodiments of the present disclosure with reference to FIG. 7 and FIG. 8.

FIG. 7 shows a schematic block diagram of an image processing encoder 500 according to an embodiment of the present disclosure. As shown in FIG. 7, the encoder 500 may include a bus 510, a processor 520 connected to the bus 510, and a memory 530 connected to the bus 510, where the processor 520 invokes, using the bus 510, a program stored in the memory 530 in order to be configured to acquire N pieces of motion information from N adjacent image blocks adjacent to a current image block, where the N adjacent image blocks are in a one-to-one correspondence with the N pieces of motion information, the N pieces of motion information are used to indicate N reference image blocks in a reference image of the current image block, and the N pieces of motion information are in a one-to-one correspondence with the N reference image blocks, determine candidate motion information from the N pieces of motion information according to a preset rule, where the candidate motion information is at least one piece of information of the N pieces of motion information, determine, in the reference image, a location range of a to-be-stored pixel according to the candidate motion information, and control the memory 530 to store all pixels in the location range, where the location range covers all pixels of a candidate reference image block, the candidate reference image block is at least one image block of the N reference image blocks, and the candidate motion information is motion information corresponding to the candidate reference image block, and read the pixels in the location range from the memory 530, and perform encoding processing on the current image block according to the pixels in the location range, to generate a target data stream.

Optionally, the candidate reference image block is at least two image blocks of the N reference image blocks, the candidate motion information is at least two pieces of motion information of the N pieces of motion information, and the processor 520 is further configured to read the pixels in the location range from the memory 530 according to the candidate motion information, to acquire the candidate reference image block, determine optimal motion information from the candidate motion information according to the candidate reference image block, and perform encoding processing on the current image block according to the optimal motion information.

Optionally, the candidate reference image block is some image blocks of the N reference image blocks.

Optionally, the processor 520 is further configured to determine the candidate motion information from the N pieces of motion information according to available memory bandwidth of the memory 530 and/or attribute information of an image to which the current image block belongs, and determine the location range in the reference image according to the candidate motion information, where the attribute information is used to indicate at least one of the following parameters definition of the image to which the current image block belongs, content of the image to which the current image block belongs, a source of the image to which the current image block belongs, or a production style of the image to which the current image block belongs.

Optionally, the processor 520 is further configured to read the pixels in the location range from the memory 530, and perform encoding processing on the current image block according to the pixels in the location range, to generate the target data stream, where the target data stream includes first index information, and the first index information is used to indicate the candidate motion information.

Optionally, the processor 520 is further configured to read the pixels in the location range from the memory 530, and perform encoding processing on the current image block according to the pixels in the location range, to generate the target data stream, where the target data stream includes second index information, and the second index information is used to indicate a location and a coverage range of the location range in the reference image.

Optionally, the candidate reference image block is all image blocks of the N reference image blocks.

In this embodiment of the present disclosure, components of the encoder 500 are coupled together using the bus 510. The bus 510 includes a power bus, a control bus, and a status signal bus in addition to a data bus. However, for clear description, various types of buses are marked as the bus 510 in the figure.

The processor 520 may implement or execute the steps and the logic block diagram disclosed in the method embodiment of the present disclosure. The processor 520 may be a microprocessor or the processor may be any conventional processor, decoder, and the like. Steps of the method disclosed with reference to the embodiment of the present disclosure may be directly executed and completed by means of a hardware processor, or may be executed and completed using a combination of hardware and software modules in a decoding processor. The software module may be located in a mature storage medium in the field, such as a random access memory (RAM), a flash memory, a read-only memory (ROM), a programmable read-only memory, an electrically-erasable programmable memory, or a register. The storage medium is located in the memory 530, and the processor reads information in the memory 530 and completes the steps in the foregoing method in combination with hardware of the processor.

It should be understood that in this embodiment of the present disclosure, the processor 520 may be a central processing unit (CPU), or the processor 520 may be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor or the processor may be any conventional processor and the like.

The memory 530 may include a read-only memory and a random access memory, and provide an instruction and data to the processor 520. A part of the memory 530 may further include a non-volatile random access memory. For example, the memory 530 may further store device type information.

In an implementation process, steps of the foregoing method may be executed by an integrated logic circuit of hardware in the processor 520 or by instructions in a software form. Steps of the method disclosed with reference to the embodiment of the present disclosure may be directly executed and completed by means of a hardware processor, or may be executed and completed using a combination of hardware and software modules in the processor. The software module may be located in a mature storage medium in the field, such as a random access memory, a flash memory, a read-only memory, a programmable read-only memory, an electrically-erasable programmable memory, or a register.

The image processing encoder 500 according to this embodiment of the present disclosure may correspond to the encoder side in the method of the embodiment of the present disclosure, and the foregoing and other operations and/or functions of each unit, that is, each module, of the image processing encoder 500 are separately intended for implementing the corresponding process of the method 100 in FIG. 1, and details are not described herein again for brevity.

According to the image processing encoder in this embodiment of the present disclosure, a location range is determined in a reference image such that the location range covers pixels corresponding to at least one piece of motion information, and in a case in which pixels in the foregoing location range are read into a memory at a time, optimal motion information can be determined from the at least one piece of motion information instead of separately reading corresponding pixels for each piece of motion information. Therefore, a requirement on memory bandwidth can be reduced, and a system requirement and costs can be reduced.

FIG. 8 shows a schematic block diagram of an image processing decoder 600 according to an embodiment of the present disclosure. As shown in FIG. 8, the decoder 600 may include a bus 610, a processor 620 connected to the bus 610, and a memory 630 connected to the bus 610, where the processor 620 invokes, using the bus 610, a program stored in the memory 630 in order to be configured to acquire N pieces of motion information from N adjacent image blocks adjacent to a current image block, where the N adjacent image blocks are in a one-to-one correspondence with the N pieces of motion information, the N pieces of motion information are used to indicate N reference image blocks in a reference image of the current image block, and the N pieces of motion information are in a one-to-one correspondence with the N reference image blocks, determine, in the reference image, a location range of a to-be-stored pixel, and control the memory 630 to store all pixels in the location range, where the location range covers all pixels of a candidate reference image block, and the candidate reference image block is at least one image block of the N reference image blocks, and read the pixels in the location range from the memory 630 according to candidate motion information of the motion information, and perform decoding processing on a target data stream according to the pixels in the location range, to reconstruct the current image block, where the candidate motion information is motion information corresponding to the candidate reference image block.

Optionally, the candidate reference image block is at least two image blocks of the N reference image blocks, the candidate motion information is at least two pieces of motion information of the N pieces of motion information, and the processor 620 is further configured to determine the candidate motion information from the N pieces of motion information, read the pixels in the location range from the memory 630 according to the candidate motion information, to acquire the candidate reference image block, determine optimal motion information from the candidate motion information according to the candidate reference image block, and perform decoding processing on the target data stream according to the optimal motion information.

Optionally, the candidate reference image block is all image blocks of the N reference image blocks.

Optionally, the candidate reference image block is some image blocks of the N reference image blocks.

Optionally, the processor 620 is further configured to determine the candidate motion information from the N pieces of motion information, and determine the location range in the reference image according to the candidate motion information.

Optionally, the processor 620 is further configured to determine the candidate motion information from the N pieces of motion information according to available memory bandwidth of the memory 630 and/or attribute information of an image to which the current image block belongs, where the attribute information is used to indicate at least one of the following parameters: definition of the image to which the current image block belongs, content of the image to which the current image block belongs, a source of the image to which the current image block belongs, or a production style of the image to which the current image block belongs.

Optionally, the processor 620 is further configured to acquire first index information from the target data stream, where the first index information is used to indicate the candidate motion information, and determine the candidate motion information from the N pieces of motion information according to the first index information.

Optionally, the processor 620 is further configured to acquire second index information from the target data stream, where the second index information is used to indicate a location and a coverage range of the location range in the reference image, and determine the location range in the reference image according to the second index information.

In this embodiment of the present disclosure, components of the decoder 600 are coupled together using the bus 610. The bus 610 includes a power bus, a control bus, and a status signal bus in addition to a data bus. However, for clear description, various types of buses are marked as the bus 610 in the figure.

The processor 620 may implement or execute the steps and the logic block diagram disclosed in the method embodiment of the present disclosure. The processor 620 may be a microprocessor or the processor may be any conventional processor, decoder, and the like. Steps of the method disclosed with reference to the embodiment of the present disclosure may be directly executed and completed by means of a hardware processor, or may be executed and completed using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 630, and the processor reads information in the memory 630 and completes the steps in the foregoing method in combination with hardware of the processor.

It should be understood that in this embodiment of the present disclosure, the processor 620 may be a CPU, or the processor 620 may be another general purpose processor, a DSP, an ASIC, a FPGA, or another programmable logical device, discrete gate or transistor logical device, discrete hardware component, or the like. The general purpose processor may be a microprocessor or the processor may be any conventional processor and the like.

The memory 630 may include a read-only memory and a random access memory, and provide an instruction and data to the processor 620. A part of the memory 630 may further include a non-volatile random access memory. For example, the memory 630 may further store device type information.

In an implementation process, steps of the foregoing method may be executed by an integrated logic circuit of hardware in the processor 620 or by instructions in a software form. Steps of the method disclosed with reference to the embodiment of the present disclosure may be directly executed and completed by means of a hardware processor, or may be executed and completed using a combination of hardware and software modules in the processor. The software module may be located in a mature storage medium in the field, such as a random access memory, a flash memory, a read-only memory, a programmable read-only memory, an electrically-erasable programmable memory, or a register.

The image processing decoder 600 in this embodiment of the present disclosure may correspond to the encoder side in the method of the embodiment of the present disclosure, and the foregoing and other operations and/or functions of each unit, that is, each module, of the image processing decoder 600 are separately intended for implementing the corresponding process of the method 200 in FIG. 4, and details are not described herein again for brevity.

According to the image processing decoder in this embodiment of the present disclosure, a location range is determined in a reference image such that the location range covers pixels corresponding to at least one piece of motion information, and in a case in which pixels in the foregoing location range are read into a memory at a time, optimal motion information can be determined from the at least one piece of motion information instead of separately reading corresponding pixels for each piece of motion information. Therefore, a requirement on memory bandwidth can be reduced, and a system requirement and costs can be reduced.

It should be noted that, in the embodiments of the present disclosure, in a case in which an encoder side and a decoder side previously determine, using a same rule, a location range and a motion vector that is used for encoding and decoding processing, it is required to ensure that manners in which the encoder side and the decoder side determine the location range (that is, a case in which the determined location range covers all or some reference image blocks) are consistent. In particular, in a case in which the determined location range covers some reference image blocks, it is required to ensure that image blocks covered by the location range determined by the encoder side are consistent with image blocks covered by the location range determined by the decoder side.

In addition, in the foregoing description, embodiments in which the location range is a rectangular range in the reference image are enumerated, but the present disclosure is not limited thereto. A shape of the location range may be set arbitrarily as long as it can be ensured that the location range can cover a candidate reference image block, which is not limited in the present disclosure.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the memory bandwidth is an indicator for evaluating a quantity of times of memory space accesses of a memory in a unit time.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An image processing method implemented by an encoder, the method comprising:
    acquiring N pieces of motion information from N adjacent image blocks adjacent to a current image block, wherein the N adjacent image blocks correspond to the N pieces of motion information, wherein the N pieces of motion information indicate N reference image blocks in a reference image of the current image block, wherein the N pieces of motion information correspond to the N reference image blocks, and wherein N is a positive integer;
    determining candidate motion information from the N pieces of motion information according to a preset rule, wherein the candidate motion information comprises two or more pieces of information of the N pieces of motion information;
    determining, in the reference image, a location range of a to-be-stored pixel according to the candidate motion information;
    storing all pixels in the location range, wherein the location range covers two or more candidate reference image blocks, wherein the candidate reference image blocks comprise two or more image blocks of the N reference image blocks, and wherein the candidate reference image block is an image block corresponding to the candidate motion information;
    reading the pixels in the location range; and
    performing encoding processing on the current image block according to the pixels in the location range, to generate a target data stream.

2. The method according to claim 1, wherein the candidate motion information comprises at least two pieces of motion information of the N pieces of motion information, wherein reading the pixels in the location range, and wherein performing encoding processing on the current image block according to the pixels in the location range comprises:
    reading the pixels in the location range according to the candidate motion information, to acquire the candidate reference image block;
    determining optimal motion information from the candidate motion information according to the candidate reference image block; and
    performing encoding processing on the current image block according to the optimal motion information.

3. The method according to claim 1, wherein the candidate reference image block comprises some image blocks of the N reference image blocks.

4. The method according to claim 3, wherein determining the candidate motion information from the N pieces of motion information according to the preset rule comprises determining the candidate motion information from the N pieces of motion information according to available memory bandwidth and/or attribute information of an image to which the current image block belongs, wherein the attribute information indicates at least one of the following parameters:
    definition of the image to which the current image block belongs;
    content of the image to which the current image block belongs;
    a source of the image to which the current image block belongs; and
    a production style of the image to which the current image block belongs.

5. The method according to claim 3, wherein reading the pixels in the location range, and wherein performing encoding processing on the current image block according to the pixels in the location range, to generate the target data stream comprises:
    reading the pixels in the location range; and
    performing encoding processing on the current image block according to the pixels in the location range, to generate the target data stream, wherein the target data stream comprises first index information, and wherein the first index information indicates the candidate motion information.

6. The method according to claim 3, wherein reading the pixels in the location range, and wherein performing encoding processing on the current image block according to the pixels in the location range, to generate the target data stream comprises:
    reading the pixels in the location range; and
    performing encoding processing on the current image block according to the pixels in the location range, to generate the target data stream, wherein the target data stream comprises second index information, and wherein the second index information indicates a location and a coverage range of the location range in the reference image.

7. The method according to claim 1, wherein the candidate reference image block comprises all image blocks of the N reference image blocks.

8. An image processing method implemented by a decoder, the method comprising:
acquiring N pieces of motion information from N adjacent image blocks adjacent to a current image block, wherein the N adjacent image blocks correspond to the N pieces of motion information, wherein the N pieces of motion information indicate N reference image blocks in a reference image of the current image block, wherein the N pieces of motion information correspond to the N reference image blocks, and wherein N is a positive integer;
determining, in the reference image, a location range of a to-be-stored pixel;
storing all pixels in the location range, wherein the location range covers two or more candidate reference image blocks, and wherein the candidate reference image blocks comprise two or more image blocks of the N reference image blocks;
reading the pixels in the location range according to candidate motion information of the N pieces of motion information; and
performing decoding processing on a target data stream according to the pixels in the location range, to reconstruct the current image block, wherein the candidate motion information is motion information corresponding to the candidate reference image block.

9. The method according to claim 8, wherein the candidate motion information comprises at least two pieces of motion information of the N pieces of motion information, wherein reading the pixels in the location range according to the candidate motion information of the motion information, and wherein performing decoding processing on the target data stream according to the pixels in the location range comprises:
determining the candidate motion information from the N pieces of motion information;
reading the pixels in the location range according to the candidate motion information, to acquire the candidate reference image block;
determining optimal motion information from the candidate motion information according to the candidate reference image block; and
performing decoding processing on the target data stream according to the optimal motion information.

10. The method according to claim 9, wherein determining the candidate motion information from the N pieces of motion information comprises determining the candidate motion information from the N pieces of motion information according to available memory bandwidth and/or attribute information of an image to which the current image block belongs, wherein the attribute information indicates at least one of the following parameters:
definition of the image to which the current image block belongs;
content of the image to which the current image block belongs;
a source of the image to which the current image block belongs; and
a production style of the image to which the current image block belongs.

11. The method according to claim 9, wherein determining the candidate motion information from the N pieces of motion information comprises:
acquiring first index information from the target data stream, wherein the first index information indicates the candidate motion information; and
determining the candidate motion information from the N pieces of motion information according to the first index information.

12. The method according to claim 8, wherein the candidate reference image block comprises all image blocks of the N reference image blocks.

13. The method according to claim 8, wherein the candidate reference image block comprises some image blocks of the N reference image blocks.

14. The method according to claim 13, wherein determining, in the reference image, the location range of the to-be-stored pixel comprises:
determining the candidate motion information from the N pieces of motion information; and
determining the location range in the reference image according to the candidate motion information.

15. The method according to claim 8, wherein determining, in the reference image, the location range of the to-be-stored pixel comprises:
acquiring second index information from the target data stream, wherein the second index information indicates a location and a coverage range of the location range in the reference image; and
determining the location range in the reference image according to the second index information.

16. The method according to claim 8, wherein:
when a prediction direction of a piece of motion information is bidirectional, a reference image block which corresponds to the piece of motion information comprises a reference block in a forward reference image and a reference block in a backward reference image; or
when a prediction direction of another piece of motion information is unidirectional, a reference image block which corresponds to the piece of motion information is a reference block in a forward reference image or a reference block in a backward reference image.

17. An image processing apparatus comprising:
a memory; and
a processor coupled to the memory and configured to:
acquire N pieces of motion information from N adjacent blocks a current image block, wherein the N adjacent image blocks correspond to the N pieces of motion information, wherein the N pieces of motion information indicate N reference image blocks in a reference image of the current image block, wherein the N pieces of motion information correspond to the N reference image blocks, and wherein N is a positive integer;
determine candidate motion information from the N pieces of motion information according to a preset rule, wherein the candidate motion information comprises two or more pieces of information of the N pieces of motion information;
determine, in the reference image, a location range of a to-be-stored pixel according to the candidate motion information, wherein the location range covers two or more candidate reference image blocks, wherein the candidate reference image blocks comprise two or more image blocks of the N reference image blocks, and wherein the candidate motion information is motion information corresponding to the candidate reference image block;

store all the pixels in the location range;

read the pixels in the location range from the memory; and perform encoding processing on the current image block according to the pixels in the location range, to generate a target data stream.

18. The apparatus according to claim 17, wherein the candidate motion information comprises at least two pieces of motion information of the N pieces of motion information, and wherein the processor is further programmed to:

read the pixels in the location range from the memory according to the candidate motion information, to acquire the candidate reference image block;

determine optimal motion information from the candidate motion information according to the candidate reference image block; and perform encoding processing on the current image block according to the optimal motion information.

19. The apparatus according to claim 17, wherein the candidate reference image block comprises some image blocks of the N reference image blocks.

20. The apparatus according to claim 19, wherein the processor is further programmed to:

determine the candidate motion information from the N pieces of motion information according to available memory bandwidth and/or attribute information of an image to which the current image block belongs; and determine the location range in the reference image according to the candidate motion information, wherein the attribute information indicates at least one of the following parameters:

definition of the image to which the current image block belongs;

content of the image to which the current image block belongs;

a source of the image to which the current image block belongs; and a production style of the image to which the current image block belongs.

21. The apparatus according to claim 19, wherein the processor is further programmed to:

read the pixels in the location range from the memory; and perform encoding processing on the current image block according to the pixels in the location range, to generate the target data stream, wherein the target data stream comprises first index information, and wherein the first index information indicates the candidate motion information.

22. The apparatus according to claim 19, wherein the processor is further programmed to:

read the pixels in the location range from the memory; and perform encoding processing on the current image block according to the pixels in the location range, to generate the target data stream, wherein the target data stream comprises second index information, and wherein the second index information indicates a location and a coverage range of the location range in the reference image.

23. The apparatus according to claim 17, wherein the candidate reference image block comprises all image blocks of the N reference image blocks.

24. An image processing apparatus comprising:
a memory; and
a processor coupled to the memory and configured to:

acquire N pieces of motion information from N adjacent image blocks adjacent to a current image block, wherein the N adjacent image blocks correspond to the N pieces of motion information, wherein the N pieces of motion information indicate N reference image blocks in a reference image of the current image block, wherein the N pieces of motion information correspond to the N reference image blocks, and wherein N is a positive integer; and determine, in the reference image, a location range of a to-be-stored pixel, wherein the location range covers two or more candidate reference image blocks, and wherein the candidate reference image blocks comprise two or more image blocks of the N reference image blocks, wherein the memory is configured to store all pixels in the location range, and wherein the processor is further configured to:

read the pixels in the location range from the memory according to candidate motion information of the N pieces of motion information; and perform decoding processing on a target data stream according to the pixels in the location range, to reconstruct the current image block, wherein the candidate motion information is motion information corresponding to the candidate reference image block.

25. The apparatus according to claim 24, wherein the candidate motion information comprises at least two pieces of motion information of the N pieces of motion information, and wherein the processor is further configured to:

determine the candidate motion information from the N pieces of motion information;

acquire the candidate motion information;

read the pixels in the location range according to the candidate motion information, to acquire the candidate reference image block;

determine optimal motion information from the candidate motion information according to the candidate reference image block; and perform decoding processing on the target data stream according to the optimal motion information.

26. The apparatus according to claim 25, wherein the processor is further configured to determine the candidate motion information from the N pieces of motion information according to available memory bandwidth and/or attribute information of an image to which the current image block belongs, wherein the attribute information indicates at least one of the following parameters:

definition of the image to which the current image block belongs;

content of the image to which the current image block belongs;

a source of the image to which the current image block belongs; and a production style of the image to which the current image block belongs.

27. The apparatus according to claim 25, wherein the processor is further configured to:

acquire first index information from the target data stream; and determine the candidate motion information from the N pieces of motion information according to the first index information, wherein the first index information indicates the candidate motion information.

28. The apparatus according to claim 24, wherein the candidate reference image block comprises all image blocks of the N reference image blocks.

29. The apparatus according to claim 24, wherein the candidate reference image block comprises some image blocks of the N reference image blocks.

30. The apparatus according to claim 29, wherein the processor is further configured to:
   determine the candidate motion information from the N pieces of motion information; and
   determine the location range in the reference image according to the candidate motion information.

31. The apparatus according to claim 24, wherein the processor is further configured to:
   acquire second index information from the target data stream; and
   determine the location range in the reference image according to the second index information, wherein the second index information indicates a location and a coverage range of the location range in the reference image.

* * * * *

UNITED STATES PATENT AND TRADEMARK OFFICE
CERTIFICATE OF CORRECTION

PATENT NO.        : 10,116,934 B2
APPLICATION NO.   : 15/178004
DATED             : October 30, 2018
INVENTOR(S)       : Jinwen Zan, Sixin Lin and Siwei Ma Page 1 of 1

It is certified that error appears in the above-identified patent and that said Letters Patent is hereby corrected as shown below:

On the Title Page

Item (30), Line 1: "201310689002" should read "201310689002.1"

In the Claims

Column 40, Line 48: "blocks a current image block," should read "image blocks adjacent to a current image block,"

Signed and Sealed this
Eleventh Day of December, 2018

Andrei Iancu
*Director of the United States Patent and Trademark Office*